(12) United States Patent
Jiang et al.

(10) Patent No.: US 9,495,928 B2
(45) Date of Patent: Nov. 15, 2016

(54) DRIVING CIRCUIT, DRIVING METHOD, DISPLAY APPARATUS AND ELECTRONIC APPARATUS

(71) Applicant: FocalTech Systems, Ltd., George Town, Grand Cayman (KY)

(72) Inventors: Xinxi Jiang, Guangdong (CN); Lianghua Mo, Guangdong (CN); Peng Zhang, Guangdong (CN)

(73) Assignee: FOCALTECH SYSTEMS, LTD., George Town (KY)

( * ) Notice: Subject to any disclaimer, the term of this patent is extended or adjusted under 35 U.S.C. 154(b) by 35 days.

(21) Appl. No.: 14/581,245

(22) Filed: Dec. 23, 2014

(65) Prior Publication Data

US 2015/0310820 A1 Oct. 29, 2015

(30) Foreign Application Priority Data

Apr. 24, 2014 (CN) .......................... 2014 1 0168610

(51) Int. Cl.
*G06F 3/041* (2006.01)
*G09G 3/36* (2006.01)

(52) U.S. Cl.
CPC .......... *G09G 3/3674* (2013.01); *G06F 3/0412* (2013.01); *G06F 3/0416* (2013.01);
(Continued)

(58) Field of Classification Search
CPC ................ G09G 3/3674; G09G 3/3685; G09G 3/3677; G09G 2310/0205; G09G
(Continued)

(56) References Cited

U.S. PATENT DOCUMENTS 5,270,687 A * 12/1993 Killebrew, Jr. .......... G09G 5/06
345/602
5,293,468 A * 3/1994 Nye ....................... G09G 3/006
345/501
(Continued)

FOREIGN PATENT DOCUMENTS

JP 2007114505 * 5/2007
TW I130190 B 10/2008
(Continued)

OTHER PUBLICATIONS

U.S. Appl. No. 1013145360, mailed Feb. 19, 2016, Taiwanese 1st Office Action and Partial English Translation.

*Primary Examiner* — Prabodh M Dharia
(74) *Attorney, Agent, or Firm* — Workman Nydegger

(57) ABSTRACT

A driving circuit includes: a clock signal generating unit, for generating clock signals, where transitions from first level to second level, in each clock signal, trigger a scan driving circuit to generate scanning signals, the transitions from first level to second level are defined as effective signal edges of the clock signals, and an interval between adjacent effective signal edges is defined as a clock time interval; and a control unit, for controlling clock time intervals of each clock signal to be non-identical, the clock time intervals including a first clock time interval and second clock time interval, the second clock time being longer than the first clock time, and the control unit is configured to control the clock time interval to be the second clock time interval at least once during displaying one frame of image by a display panel.

37 Claims, 8 Drawing Sheets

(52) U.S. Cl.
CPC .......... *G09G 3/3677* (2013.01); *G09G 3/3685* (2013.01); *G09G 2310/0202* (2013.01); *G09G 2310/0205* (2013.01); *G09G 2310/0278* (2013.01); *G09G 2310/08* (2013.01); *G09G 2330/06* (2013.01)

(58) Field of Classification Search
CPC ................ 2310/0278;G09G 2310/0202; G09G 2310/08; G09G 2330/06; G06F 3/0412; G06F 3/0416
USPC .......... 345/99–104, 173–178, 204–214, 698; 349/12; 377/10, 64; 725/39
See application file for complete search history.

(56) References Cited

U.S. PATENT DOCUMENTS

| | | | | |
|---|---|---|---|---|
| 5,572,335 | A * | 11/1996 | Stevens | H04N 1/32358 345/501 |
| 7,495,646 | B2 * | 2/2009 | Kawabe | G09G 3/342 345/95 |
| 7,793,179 | B2 | 9/2010 | Sul | |
| 8,248,344 | B2 * | 8/2012 | Song | G09G 3/3614 345/100 |
| 2002/0008688 | A1 * | 1/2002 | Yamamoto | G09G 3/3648 345/98 |
| 2003/0020702 | A1 * | 1/2003 | Matsuyama | G09G 3/367 345/204 |
| 2003/0110491 | A1 * | 6/2003 | Rodriguez | G06F 3/0481 725/39 |
| 2004/0174197 | A1 | 9/2004 | Kida et al. | |
| 2005/0078100 | A1 * | 4/2005 | Tsujino | G09G 3/20 345/204 |
| 2005/0201508 | A1 * | 9/2005 | Shin | G09G 3/3677 377/10 |
| 2005/0219188 | A1 * | 10/2005 | Kawabe | G09G 3/342 345/94 |
| 2006/0232543 | A1 * | 10/2006 | Kobayashi | G09G 3/3688 345/100 |
| 2007/0109332 | A1 * | 5/2007 | Komatsu | G09G 3/3611 345/698 |
| 2009/0040168 | A1 * | 2/2009 | Liu | G09G 3/3677 345/100 |
| 2009/0231323 | A1 * | 9/2009 | Kang | G09G 3/3685 345/213 |
| 2011/0267283 | A1 * | 11/2011 | Chang | G06F 3/0418 345/173 |
| 2012/0081349 | A1 * | 4/2012 | Tomita | G09G 3/20 345/211 |
| 2013/0215002 | A1 | 8/2013 | Shen et al. | |
| 2014/0009460 | A1 * | 1/2014 | Nakamura | G09G 3/34 345/214 |

FOREIGN PATENT DOCUMENTS

| | | |
|---|---|---|
| TW | I341393 | 5/2011 |
| TW | I407840 B | 9/2013 |
| TW | M500968 U | 5/2015 |

* cited by examiner

DRIVING CIRCUIT, DRIVING METHOD, DISPLAY APPARATUS AND ELECTRONIC APPARATUS

CROSS REFERENCES OF RELATED APPLICATION

The present application claims the priority to Chinese Patent Application No. 201410168610.2, entitled "DRIVING CIRCUIT, DRIVING METHOD, DISPLAY APPARATUS AND ELECTRONIC APPARATUS", filed on Apr. 24, 2014 with the State Intellectual Property Office of People's Republic of China, which is incorporated herein by reference in its entirety.

FIELD

The disclosure relates to the field of integrated electronics, and in particular to a driving circuit, a driving method, a display apparatus and an electronic apparatus.

BACKGROUND

With the gradually increasing requirement for the integration level of an electronic apparatus, a display apparatus is generally integrated with other electronic apparatuses into an electronic apparatus. For example, a display apparatus and a touch apparatus are integrated in a mobile phone to realize touch and display functions. However, when the display apparatus performs a display operation, voltage and current in a driving signal may change with time, thereby generating electromagnetic interference. The electromagnetic interference is a noise for other electronic apparatuses integrated with the display apparatus.

SUMMARY

A driving circuit, a driving method, a display apparatus and an electronic apparatus are provided in the disclosure, to reduce the influence on other electronic apparatuses from the electromagnetic interference of the display apparatus.

A driving circuit is provided in the disclosure, for driving a display panel to display an image. The display panel includes a plurality of display units and a plurality of scanning lines, each scanning line is connected to a plurality of display units, and the plurality of scanning lines are configured to transmit scanning signals, which are provided by a scan driving circuit, to the plurality of display units to enable the display units connected to the scanning lines to display the image. The driving circuit includes: a clock signal generating unit, for generating clock signals; where in each clock signal, first levels and second levels alternately occur; a potential of the first level is different from a potential of the second level; transitions from the first level to the second level, in each clock signal, are for triggering the scan driving circuit to generate scanning signals to be correspondingly transmitted by the respective scanning lines; the transitions from the first level to the second level are defined as effective signal edges of the clock signals, and an interval between adjacent effective signal edges is defined as a clock time interval; and a control unit for controlling the clock time intervals of each clock signal to be non-identical, where the clock time intervals include a first clock time interval and a second clock time interval, the second clock time interval being longer than the first clock time interval; and the control unit is further for controlling the clock time interval to be the second clock time interval at least once as during a process of displaying one frame of image by the display panel.

Correspondingly, a driving method is further provided in the disclosure, for driving a display panel to display an image. The display panel including a plurality of display units and a plurality of scanning lines, each scanning line being connected to a plurality of display units; the plurality of scanning lines being for transmitting scanning signals, which are provided by a scan driving circuit, to the plurality of display units to enable the display units connected to the scanning lines to display the image. The driving method includes: generating clock signals; where in each clock signal, first levels and second levels alternately occur; a potential of the first level is different from a potential of the second level; transitions from the first level to the second level, in each clock signal, are for triggering the scan driving circuit to generate scanning signals to be correspondingly transmitted by the respective scanning lines; the transitions from the first level to the second level are defined as effective signal edges of the clock signals, and an interval between adjacent effective signal edges is defined as a clock time interval; and controlling the clock time intervals of each clock signal to be non-identical, where the clock time intervals include a first clock time interval and a second clock time interval, the second clock time interval being longer than the first clock time interval; and the clock time interval is controlled to the second clock time interval at least once during a process of displaying one frame of image by the display panel.

Correspondingly, a display apparatus is provided in the disclosure. The display apparatus includes: a display panel, including a plurality of display units and a plurality of scanning lines; where each scanning line is connected to a plurality of display units; and the plurality of scanning lines are configured to transmit scanning signals, which are provided by a scan driving circuit, to the plurality of display units, to enable the display units connected to the scanning lines to display an image; and the driving circuit provided in the disclosure, for driving the display panel to display the image.

Correspondingly, a display apparatus is provided in the disclosure. The display apparatus includes: a display panel, including a plurality of display units and a plurality of scanning lines; where each scanning line is connected to a plurality of display units; and the plurality of scanning lines are configured to transmit scanning signals, which are provided by a scan driving circuit, to the plurality of display units, to enable the display units connected to the scanning lines to display an image; the driving circuit provided in the disclosure, for driving the display panel to display the image; and a touch panel and a touch detection circuit connected to the touch panel, where the touch detection circuit performs a touch detection on the touch panel during a suspension duration.

Correspondingly, an electronic apparatus is further provided in the disclosure. The electronic apparatus includes a display apparatus. The display apparatus includes: a display panel including a plurality of display units and a plurality of scanning lines; where each scanning line is connected to a plurality of display units; and the plurality of scanning lines are configured to transmit scanning signals, which are provided by a scan driving circuit, to the plurality of display units, to enable the display units connected to the scanning lines to display an image; and the driving circuit provided in the disclosure, for driving the display panel to display the image.

Correspondingly, an electronic apparatus is further provided in the disclosure. The electronic apparatus includes a first apparatus and a second apparatus, where the first apparatus is a display apparatus, the display apparatus includes the driving circuit provided in the disclosure, and the second apparatus works during the suspension duration.

DETAILED DESCRIPTION OF THE EMBODIMENTS

To make the above features and advantages of the disclosure more obvious and easier to be understood, specific embodiments of the disclosure are hereinafter illustrated in detail in conjunction with accompanying drawings.

Figure 1:
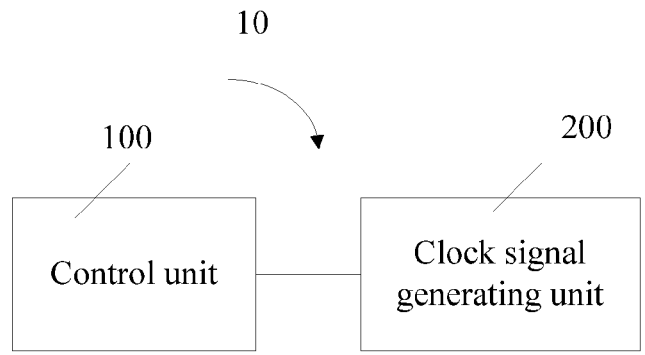
FIG. 1 is a functional block diagram of a driving circuit according to a first embodiment of the disclosure.
Figure 2:
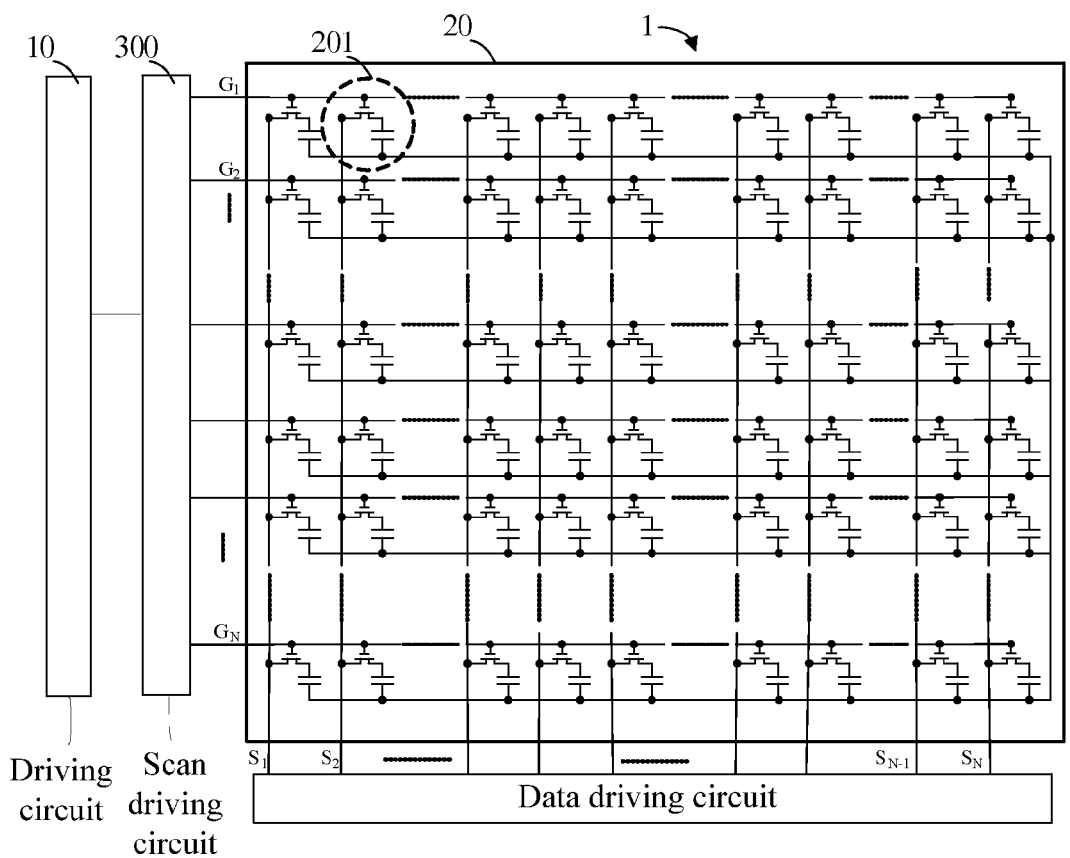
FIG. 2 is a schematic diagram of an exemplary display apparatus provided in the disclosure.

FIG. 1 is a functional block diagram of a driving circuit according to a first embodiment of the disclosure, and FIG. 2 is a schematic diagram of an exemplary display apparatus provided in the disclosure. The display apparatus 1 includes the driving circuit 10, a display panel 20, a scan driving circuit 300 and a data driving circuit (not labeled with numerical reference in FIG. 2). The driving circuit 10 is connected to the scan driving circuit 300. The scan driving circuit 300 and the data driving circuit are respectively connected to the display panel 20. The driving circuit 10 is configured to drive the display panel 20 to display images. The display panel 20 includes a plurality of display units 201 and a plurality of scanning lines $G_1, G_2, \ldots, G_N$. Each of the scanning lines $G_1, G_2, \ldots, G_N$ is connected to a portion of the display units 201. The scanning lines $G_1, G_2, \ldots, G_N$ are configured to transmit scanning signals provided by the scan driving circuit 300 to the display units 201. The display units 201 connected to the scanning lines $G_1, G_2, \ldots, G_N$ are enabled to display the images according to the scanning signals.

The display panel 20 may be a liquid crystal display panel or other suitable panels, for example. Each display unit 201 includes a Thin Film Transistors (TFT, which is not labeled in FIG. 2) and a pixel electrode (not labeled in FIG. 2) connected to the TFT. The scanning lines $G_1, G_2, \ldots, G_N$ are connected to gate electrodes (not labeled in FIG. 2) of the TFTs. The scanning signals provided by the scan driving circuit 300 are configured to turn on the TFTs respectively connected to the scanning lines $G_1, G_2, \ldots, G_N$, and the display units 201 connected to the scanning lines $G_1, G_2, \ldots, G_N$ are correspondingly activated. The data driving circuit provides data signals to pixel electrodes via the activated TFTs. The display units 201 displaying the images according to the data signals.

The driving circuit 10 includes a clock signal generating unit 200 and a control unit 100 connected to the clock signal generating unit 200.

The clock signal generating unit 200 is configured to generate clock signals. Each clock signal includes a plurality of first levels and a plurality of second levels different from the first levels. The first levels and the second levels are alternately output from the clock signal generating unit 201. A potential of the first levels is different from a potential of the second levels. A transition from the first level to the second level is configured to trigger the scan driving circuit 300 to generate the scanning signals.

The transition from the first level to the second level is defined as an effective signal edge of a clock signal, and a time interval between two adjacent effective signal edges is defined as a clock time interval. For example, if the first level is a low level and the second level is a high level, the effective signal edge is a rising edge; or if the first level is a high level and the second level is a low level, the effective signal edge is a falling edge.

The control unit 100 is configured to control each clock signal to have different clock time intervals. The clock time intervals include a first clock time interval and a second clock time interval. The second clock time interval is longer than the first clock time interval. The control unit 100 is further configured to control the clock time interval to be the second clock time interval at least once during a process of displaying one frame of image by the display panel 20.

Optionally, a duration of the second level of the clock signal generated by the clock signal generating unit 200 is identical with a duration of the scanning signal provided by the scan driving circuit 300. The control unit 100 may control the clock time intervals of the clock signal to be non-identical via controlling durations of the first levels to be non-identical.

Specifically, the control unit 100 is configured to control durations of the respective first levels of the clock signal to be non-identical, and control durations of the respective second levels of the clock signal to be identical. The durations of the first levels include a plurality of first durations and at least one second duration. The second duration is longer than the first duration. The control unit 100 is configured to control the duration of the first level to be the second duration at least once during the process of displaying one frame of image displayed by the display panel 20. A sum of the first duration of the first level and the duration of the second level equals the first clock time interval, and a sum of the second duration of the first level and the duration of the second level equals to the second clock time interval. In the embodiment, the second duration may range from 9 µs to 400 µs, e.g., the second duration may be 200 µs.

Figure 3:
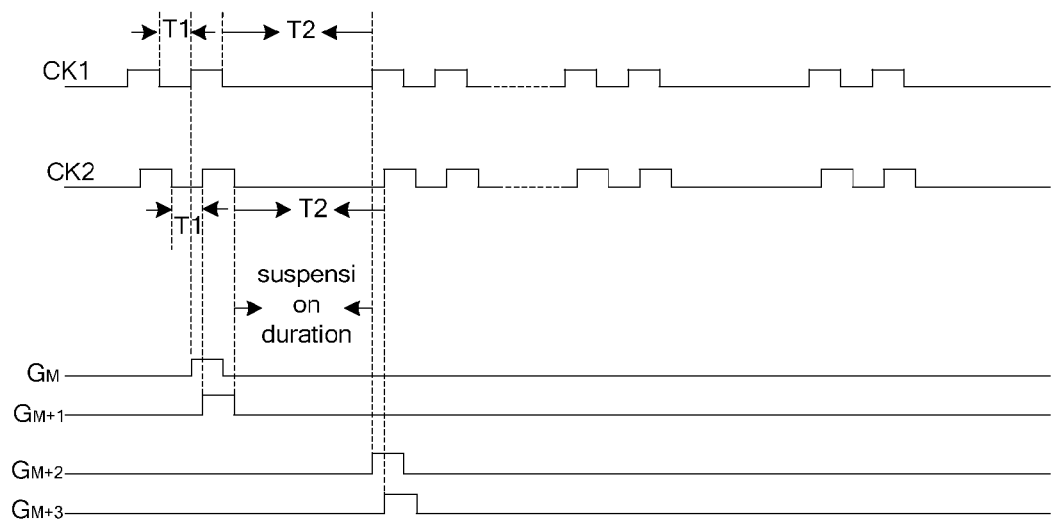
FIG. 3 schematically shows signals output from a clock signal generating unit shown in FIG. 1.

FIG. 3 schematically shows the clock signals output from the clock signal generating unit 200 in FIG. 1. The clock signal generating unit 200 is configured to generate two clock signals CK1 and CK2. Low levels and high level of the two clock signals CK1 and CK2 are alternately output from the clock signal generating unit 201. The scan driving circuit 300 is triggered to generate the scanning signals at rising edges (transitions from the low levels to the high levels) of the clock signals CK1 and CK2. The rising edges are effective signal edges, and a time interval between two adjacent rising edges is taken as the clock time interval.

In the embodiment, the first levels of the two clock signals CK1 and CK2 are the low levels and the second levels are the high levels. The low levels are not configured to control the scan driving circuit to generate the scanning signal. The high levels are configured to control the duration of the scanning signals generated by the scan driving circuit. The low level may range from −15V to −7.5V, e.g., the low level may be −12V. The high level may range from 10V to 15V, e.g., the high level may be 15V.

In the embodiment, the first duration T1 of the low level of the clock signal CK1 is the identical with the duration of the high level of the clock signal CK2. That is to say, the first duration T1 of the low level of the clock signal CK1 equals a duration of generating a scanning signal from the scan driving circuit 300 driven by the high level of the clock signal CK2. Similarly, the first duration T1 of the low level of the clock signal CK2 is the identical with the duration of the high level of the clock signal CK1. That is to say, the first duration T1 of the low level of the clock signal CK2 is a duration of generating a scanning signal from the scan driving circuit 300 driven by the high level of the clock signal CK1. Accordingly, the scan driving circuit 300 may apply the scanning signals to the scanning lines connected to the scan driving circuit 300 to perform a progressive scanning.

The control unit 100 may control the duration of the low level of the clock signals CK1 and CK2 to be equal to the second duration T2, and the second duration T2 is longer than the first duration T1. An overlapping duration of the second durations T2 of the low levels of the clock signals CK1 and CK2 is defined as a suspension duration. No rising edge may occur in the clock signals CK1 and CK2, i.e., no transition from the low level to the high level may occur, during the suspension duration. Therefore, the scan driving circuit 300 may not be triggered to generate the scanning signals, and accordingly, the progressive scanning along the scanning lines is suspended.

As shown in FIG. 3, under driving of the clock signals CK1 and CK2, after the scanning lines $G_M$ and $G_{M+1}$ are scanned by the scanning signals generated by the scan driving circuit, the scanning to the next scanning line $G_{M+2}$ is suspended to scan during the suspension duration. Until the second duration T2 of the clock signal CK1 terminates, a transition from the low level to the high level of the clock signal CK1 triggers the scan driving circuit 300 to apply the scanning signal to the scanning line $G_{M+2}$ to perform the scanning. Similarly, until the second duration T2 of the CK2 terminates, a transition from the low level to the high level triggers the scan driving circuit 300 to apply the scanning signal to the scanning line $G_{M+3}$ to perform the scanning.

That is to say, the display panel 20 suspends the progressive scanning along the scanning lines $G_1$, $G_2$, . . . , $G_N$ during the suspension duration. Accordingly, no or less electromagnetic interference may be generated in the display apparatus 1 due to suspension of scanning the scanning lines $G_1$, $G_2$, . . . , $G_N$. Therefore, other electronic apparatuses integrated with the display apparatus 1 may perform precise operations such as a detection without much electromagnetic interference during the suspension duration.

It should be noted that, as shown in FIG. 3, the duration of the high level of the clock signals CK1 and CK2 generated by the clock signal generating unit 200 equals the duration of the scanning signal. In other embodiments, under the control of the control unit 100, the durations of the high levels of the clock signals CK1 and CK2 each generated by the clock signal generating unit 200 include a plurality of first durations and at least one second duration longer than the first durations, and the durations of the low levels of the clock signals CK1 and CK2 generated by the clock signal generating unit 200 are identical. Accordingly, the scanning signal is applied to a current scanning line to perform the scanning for a long time when the duration of the high level of the clock signals CK1 and CK2 is the second duration. Furthermore, since the scanning signal on the scanning line keeps unchanged during the long time, no or less electromagnetic interference is generated and accordingly, the noise may be reduced.

Similarly, in other embodiments, the scan driving circuit 300 may be triggered by a falling edge of the clock signal (a transition from the high level to the low level) to generate the scanning signal, and the control unit 100 controls the duration of the high level of the clock signals CK1 and CK2 to be equal the second duration. That is to say, under the control of the control unit 100, no falling edge occurs during a long period (the suspension duration) in the clock signals CK1 and CK2 output from the clock signal generating unit 200. Accordingly, the scan driving circuit 300 is not triggered by the clock signals CK1 and CK2 to generate the scanning signal during the long period. Therefore, no scanning signal is transmitted to the scanning line on the display panel 20 during the long period, i.e., the progressive scanning along the scanning lines is suspended during the long period, thereby reducing the noise generated by the electromagnetic interference.

In other embodiments, the durations of the low levels of the clock signals CK1 and CK2 may equal the durations of the scanning signals, correspondingly. Under the control of the control unit 100, the durations of the low levels of the clock signals CK1 and CK2 output from the clock signal generating unit 200 include a plurality of first durations and at least one second duration longer than the first durations. When one of the durations of the low levels of the clock signals CK1 and CK2 equals the second duration, the scanning signal is applied to a current scanning line during a long period to perform the scanning. Since the scanning signal applied to the scanning line keeps unchanged during the long period, noise generated by the electromagnetic interference may also be reduced.

As shown in FIG. 2 and FIG. 3, during the process of displaying one frame of image displayed by the display panel 20, the driving circuit 10 in the embodiment may suspend the scanning along the scanning lines $G_1$, $G_2$, . . . , $G_N$ one or more times, and suspension quantities, suspension durations, and suspension positions may be preset.

It should be noted that, as shown in FIG. 3, the duration of the second level of the clock signals CK1 and CK2 is the identical with the duration of the scanning signal generated by the scan driving circuit 300. However, the disclosure is not limited thereto, in other embodiments, a sum of the durations of the first level and the second level of each of the clock signals CK1 and CK2 may be the identical with the duration of the scanning signal generated by the scan driving circuit 300.

Correspondingly, the control unit 100 is configured to control the durations of the respective first levels of the clock signal to be non-identical, and control the durations of the respective second levels of the clock signal to be identical. The durations of the respective first levels include a plurality of first durations and at least one second duration, the second duration being longer than the first duration. The control unit 100 is further configured to control the duration of the first level to be the second duration at least once during the process of displaying one frame of image displayed by the display panel 20. A sum of the first duration of the first level and the duration of the second level equals the first clock time interval, and a sum of the second duration of the first level and the duration of the second level equals the second clock time interval. That is to say, the control unit 100 may control the clock time intervals to be non-identical via controlling the durations of the first levels to be non-identical.

Alternatively, the control unit 100 is configured to control the durations of the respective second levels of the clock signal to be non-identical, and control the durations of the respective first levels of the clock signal to be identical. The durations of the respective second levels include a plurality of first durations and at least one second duration, the second duration being longer than the first duration. The control unit 100 is further configured to control the duration of the second level to be the second duration at least once during the process of displaying one frame of image displayed by the display panel 20. A sum of the first duration of the second level and the duration of the first level equals the first clock time interval, and a sum of the second duration of the second level and the duration of the first level equals the second clock time interval. That is to say, the control unit 100 may control the clock time intervals to be non-identical via controlling the durations of the second levels to be non-identical.

The interval between two adjacent effective signal edges may be increased via controlling the clock time interval. Accordingly, the scan driving circuit 300 may not be triggered to generate the scanning signal during a long period, or the scanning signal is applied to the current scanning line to perform the scanning for a long period. Therefore, the scanning signal applied to the scanning line keeps unchanged during the long period, no or less electromagnetic interference is generated, and accordingly, noise may be reduced.

Figure 4:
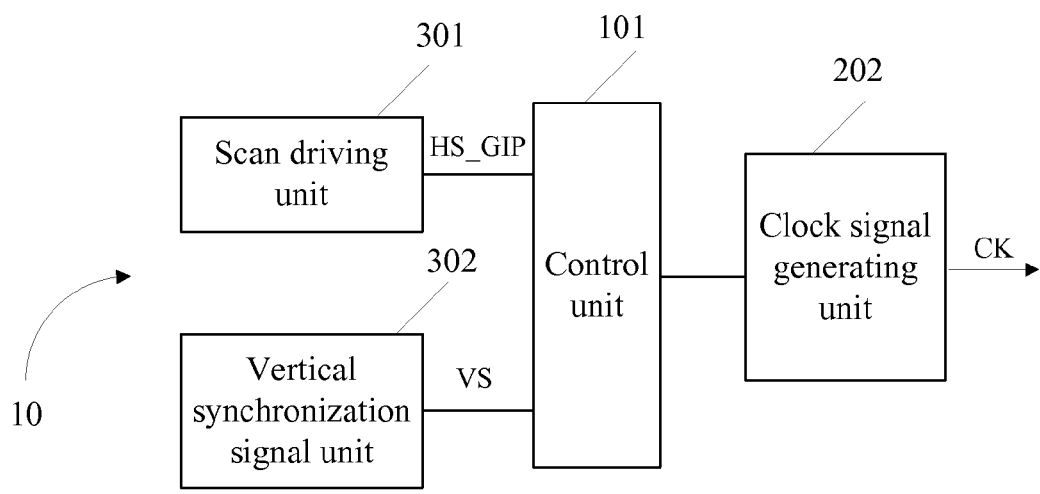
FIG. 4 is a schematic diagram of a driving circuit according to a second embodiment of the disclosure.

FIG. 4 is a schematic diagram of a driving circuit according to a second embodiment of the disclosure. The driving circuit includes a scan driving unit 301, a vertical synchronization signal unit 302, a control unit 101, and a clock signal generating unit 202. The control unit 101 is connected to the scan driving unit 301, the vertical synchronization signal unit 302, and the clock signal generating unit 202. It should be noted that, the scanning lines are configured to enable a display of respective frames of images based on a vertical synchronization signal VS provided by the vertical synchronization signal unit 302. The scan driving unit 301 is configured to provide a horizontal synchronization signal HS_GIP. The driving circuit 10 in the embodiment may determine a suspension position of a scanning based on the vertical synchronization signal VS and the horizontal synchronization signal HS_GIP.

Specifically, the control unit 101 is configured to determine whether to control a duration of a first level of a clock signal CK to be a second duration, based on the vertical synchronization signal VS and the horizontal synchronization signal HS_GIP. That is to say, the control unit 101 of the driving circuit 10 in the embodiment determines a suspension position for setting a suspension duration, based on the vertical synchronization signal VS and the horizontal synchronization signal HS_GIP.

For example, during a process of displaying one frame of image, 1280 rows of the scanning lines need to be scanned. After receiving the vertical synchronization signal VS, the control unit 101 controls the durations of the first levels of the clock signal CK to be the second duration at intervals of receiving every 64 horizontal synchronization signals HS_GIP. Accordingly, the suspension durations during which the progressive scanning along the scanning lines is suspended are formed, and 19 suspension durations are formed during the process of displaying one frame of image.

However, the disclosure does not limit whether to set the suspension durations based on the vertical synchronization signal VS and the horizontal synchronization signal HS_GIP. In other embodiments, the control unit 101 may determine positions for setting the suspension durations in other ways and may generate the suspension durations by controlling the clock signal generating unit 200. The control unit 101 may determine the positions for generating the suspension durations based on time. For example, the scanning from a first row of scanning line to a 1280-th row of scanning line needs 10 ms, the control unit 101 may control the duration of the first level of the clock signal CK to be equal to the second duration at a time instant when the scanning is performed for 5 ms; hence, the scanning along the progressive scanning lines is suspended between a 641-th row of scanning line and a 642-th row of scanning line.

Figure 5:
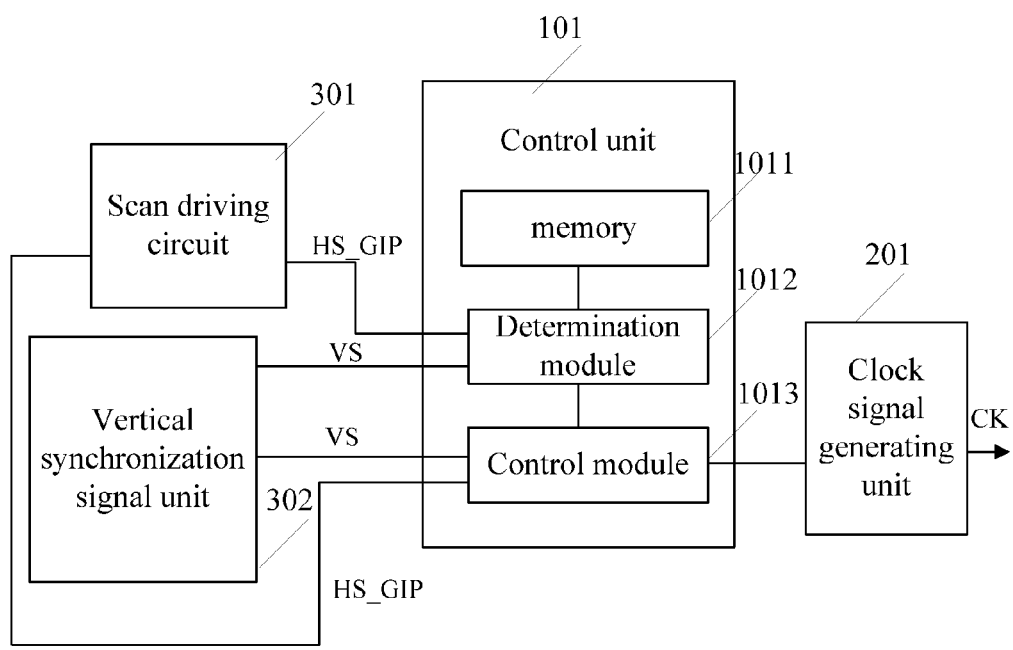
FIG. 5 is a schematic diagram of a control unit shown in FIG. 4.
Figure 6:
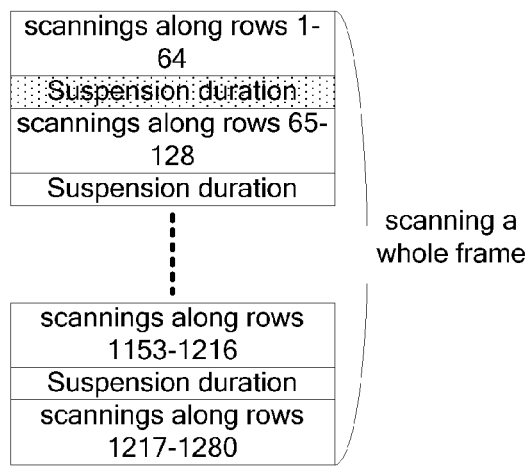
FIG. 6 is a schematic diagram showing a scanning performed by the control unit shown in FIG. 4.

FIG. 5 and FIG. 6 respectively are a schematic diagram of the control unit in FIG. 4 and a schematic diagram showing the scanning. The control unit 101 includes a memory 1011, a determination module 1012 and a control module 1013.

The memory 1011 is configured to store preset row information, and row information of the scanning lines under a condition that the clock time interval is controlled to be the second clock time interval is set as the preset row information.

In the embodiment, row information of the scanning lines under a condition that the duration of the first level of the clock signal CK is controlled to be equal to the second duration is set as the preset row information, while the disclosure is not limited thereto. In other embodiments, row information of the scanning lines under a condition that the duration of the second level of the clock signal is controlled to be a long period may be set as the preset row information.

For example, during the process of displaying one frame of image, scanning signals need to be applied to 1280 rows of scanning lines to perform the progressive scanning. The preset row information is, row information of corresponding scanning lines under a condition that the duration of the first level of the clock signal is controlled to be the second duration after the scannings along the 64-th row of scanning line, along a 128-th row of scanning line, . . . , along a 1216-th row of scanning line are completed; hence, respective suspension durations for pausing the progressive scanning along the scanning lines are set after the scanning along the 64-th row of scanning line and before the scanning along the 65-th row of the scanning line, after the scanning along the 128-th row of scanning line and before the scanning along a 129-th scanning line, . . . , and after the scanning along the 1216-th row of the scanning line and before the scanning along a 1217-th row of scanning line.

The memory 1011 may be an editable memory, which may store different preset row information to adapt to needs of different electronic apparatuses.

The determination module 1012 is connected to the vertical synchronization signal unit 302, the scan driving circuit 301 and the memory 1011, and is configured to determine, after the vertical synchronization signal VS is received, whether a received horizontal synchronization signal HS_GIP meets the preset row information.

For example, the preset row information is configured to control the duration of the first level of the clock signal CK to be equal to the second duration after the scanning along the 64-th row of scanning line is completed, to suspend the progressive scanning along the scanning lines for one suspension duration. After receiving the vertical synchronization signal VS sent from the vertical synchronization signal unit 302, the determination module 102 determines that the horizontal synchronization signal HS_GIP does not meet the preset row information before receiving 64-th horizontal synchronization signal HS_GIP sent from the scan driving circuit 301; and the determination module 1012 determines that the horizontal synchronization signal HS_GIP meets the preset row information when receiving the 64-th horizontal synchronization signal HS_GIP sent from the scan driving circuit 301.

The control module 1013 is connected to the vertical synchronization signal unit 302, the scan driving circuit 301 and the determination module 1012, and is configured to control the duration of the first level output from the clock signal generating unit 201 to be equal to the second duration in the case that the determination module 1012 determines that the horizontal synchronization signal HS_GIP meets the preset row information.

For example, in the clock signal CK output from the clock signal generating unit 201, high levels and low levels are alternately output, and rising edges in the clock signal CK are for triggering the scan driving circuit 301 to generate the scanning signals. The control module 1013 may control the duration of the low level output from the clock signal generating unit 201 to be equal to the second duration in the case that the determination module 1012 determines that the horizontal synchronization signal HS_GIP meets the preset row information; hence, during a long period, no rising edge occurs and the scan driving circuit 301 may not be triggered to generate the scanning signal, thereby reducing noise generated by the electromagnetic interference.

Figure 7:
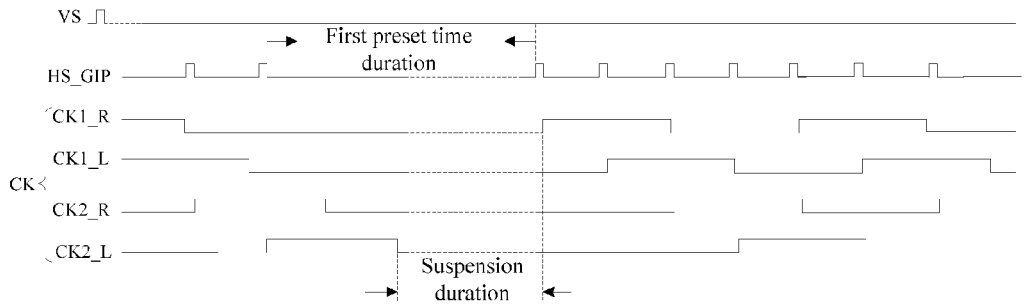
FIG. 7 schematically shows signals generated by the driving circuit shown in FIG. 5.

It should be noted that, the control module 1013 may control the clock signal generating unit 201 in multiple ways. FIG. 7 schematically shows signals generated by the driving circuit shown in FIG. 5.

The control module 1013 is configured to send the horizontal synchronization signal HS_GIP to the clock signal generating unit 201. The clock signal generating unit 201 is configured to generate the clock signal CK based on the horizontal synchronization signal HS_GIP.

Here, the clock signal generating unit 201 may output a first clock signal CK1_R, a second clock signal CK1_L, a third clock signal CK2_R and a fourth clock signal CK2_L; hence, the scan driving circuit 301 generates scanning signals respectively provided for four scanning lines. As shown in FIG. 7, the horizontal synchronization signal HS_GIP includes a plurality of square wave signals sequentially triggering generations the first clock signal CK1_R, the second clock signal CK1_L, the third clock signal CK2_R and the fourth clock signal CK2_L. Specifically, in the embodiment, falling edges of the square wave signals are for triggering the generations of the clock signals CKs.

The control module 1013 is configured to stop the providing of the horizontal synchronization signal HS_GIP to the clock signal generating unit 201, for a first preset time duration in the case that the determination module 1012 determines that the horizontal synchronization signal HS_GIP meets the preset row information, thereby the duration of the first level of the clock signal being equal to the second duration.

In FIG. 7, rising edges in the first clock signal CK1_R, the second clock signal CK1_L, the third clock signal CK2_R and the fourth clock signal CK2_L are for triggering the scan driving circuit 301 to generate the scanning signals. The control module 1013 stops sending the horizontal synchronization signal HS_GIP corresponding to a next row of scanning line (for example, the 65-th row of scanning line) to the clock signal generating unit 201, for the first preset time duration in the case that the determination module 1012 determines that the horizontal synchronization signal HS_GIP meets the preset row information (for example it is determined that the horizontal synchronization signal HS_GIP is the horizontal synchronization signal HS_GIP for the 64-th row of scanning line). During the first preset time duration, since the clock signal generating unit 201 does not receive the horizontal synchronization signal HS_GIP for a next row of scanning line (for example the 65-th row of scanning line), the clock signal generating unit 201 may not generate a clock signal; therefore, the scan driving circuit 301 may not be triggered to generate the scanning signal for the scanning along the next row of scanning line (for example the 65-th row of scanning line), and accordingly, noise caused by the electromagnetic interference is reduced. When the first preset time duration terminates, the control module 1013 sends the horizontal synchronization signal HS_GIP corresponding to the next row of scanning line (for example the 65-th row of scanning line) to the clock signal generating unit 201, thereby achieving the scanning along the next row of scanning line (for example the 65-th row of scanning line).

In FIG. 7, an interval between the falling edge of CK2_L and the rising edge of CK1_R is taken as an overlapping time duration of the first clock signal CK1_R, the second clock signal CK1_L, the third clock signal CK2_R and the fourth clock signal CK2_L, which is defined as the suspension duration; and during the suspension duration the scan driving circuit 301 suspends the progressive scanning along the scanning lines.

Figure 8:
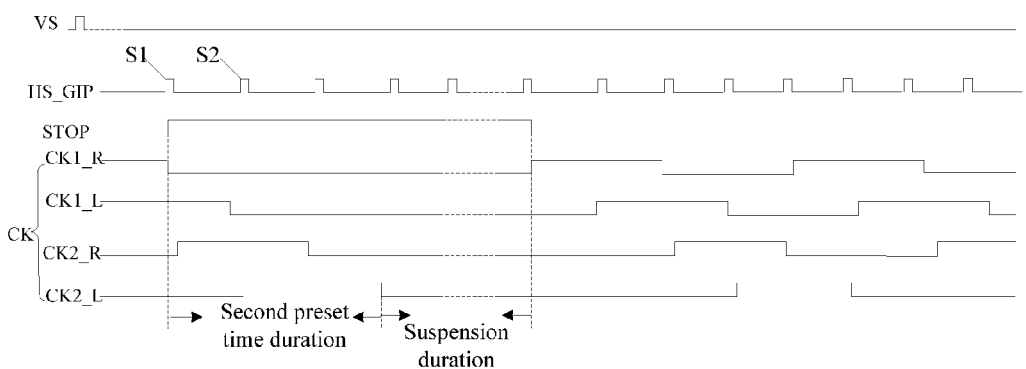
FIG. 8 schematically shows signals generated by the driving circuit shown in FIG. 5.

The control unit 101 may control the clock signal generating unit 201 in other ways. FIG. 8 schematically shows signals generated by the driving circuit shown in FIG. 5. In the embodiment, the control unit 101 controls the clock signal generating unit 201 by setting a stop signal STOP.

The control module 1013 of the control unit 101 is configured to generate the stop signal STOP in the case that the determination module 1012 determines that the horizontal synchronization signal HS_GIP meets the preset row information. The stropping signal STOP includes an ineffective signal and an effective signal, where the ineffective signal does not influence the clock signal CK generated by the clock signal generating unit 201, a switch from the ineffective signal to the effective signal is configured to trigger a control for the clock signal CK, and a duration of the effective signal is associated with the second duration of the first level of the clock signal.

In the embodiment, the stop signal is a square wave signal having a third level (a low level) and a fourth level (a high level), and a potential of the third level is different from a potential of the fourth level. The low level is the ineffective signal and the high level is the effective signal. As shown in FIG. 8, after the stop signal STOP switches from the low level to the high level, the clock signal generating unit 201 outputs a third clock signal CK2_R and a fourth clock signal CK2_L based on S1 and S2 in the horizontal synchronization signal; then no clock signal CK is output, and the suspension duration for pausing the scanning along the scanning lines occurs. That is to say, in the embodiment, the clock signal generating unit 201 is configured to control the duration of the first level of the output CK2_L to be equal to the second duration after a second preset time duration is elapsed from the switch of the stop signal STOP from the ineffective signal (the low level) to the effective signal (the high level). The suspension duration is the interval between the falling edge of the CK2_L and the rising edge of the CK1_R.

As shown in FIG. 8, the clock signal generating unit 201 outputs the clock signal CK (specifically, the first clock signal CK1_R) immediately when the stropping signal STOP is switched from the effective signal (the high level) to the ineffective signal (the low level). That is to say, the first duration is recovered as the duration of the first level immediately when the stop signal STOP is switched from the effective signal to the ineffective signal.

However, the disclosure is not limited thereto; in other embodiments, the clock signal generating unit 201 may control the duration of the output first level to be equal to the second duration immediately when the stop signal is switched from the ineffective signal to the effective signal; or the first duration is recovered as the duration of the first level after a preset time duration is elapsed from a switch of the stop signal STOP from the effective signal to the ineffective signal.

In addition, the disclosure does not limit the form of the stop signal STOP; in addition to the square wave signal, the stop signal STOP may be a stepped signal, a trapezoid signal, etc.

Figure 9:
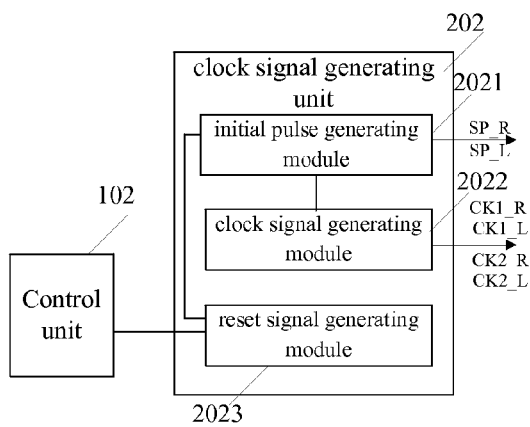
FIG. 9 is a schematic diagram of a driving circuit according to a third embodiment of the disclosure.
Figure 10:
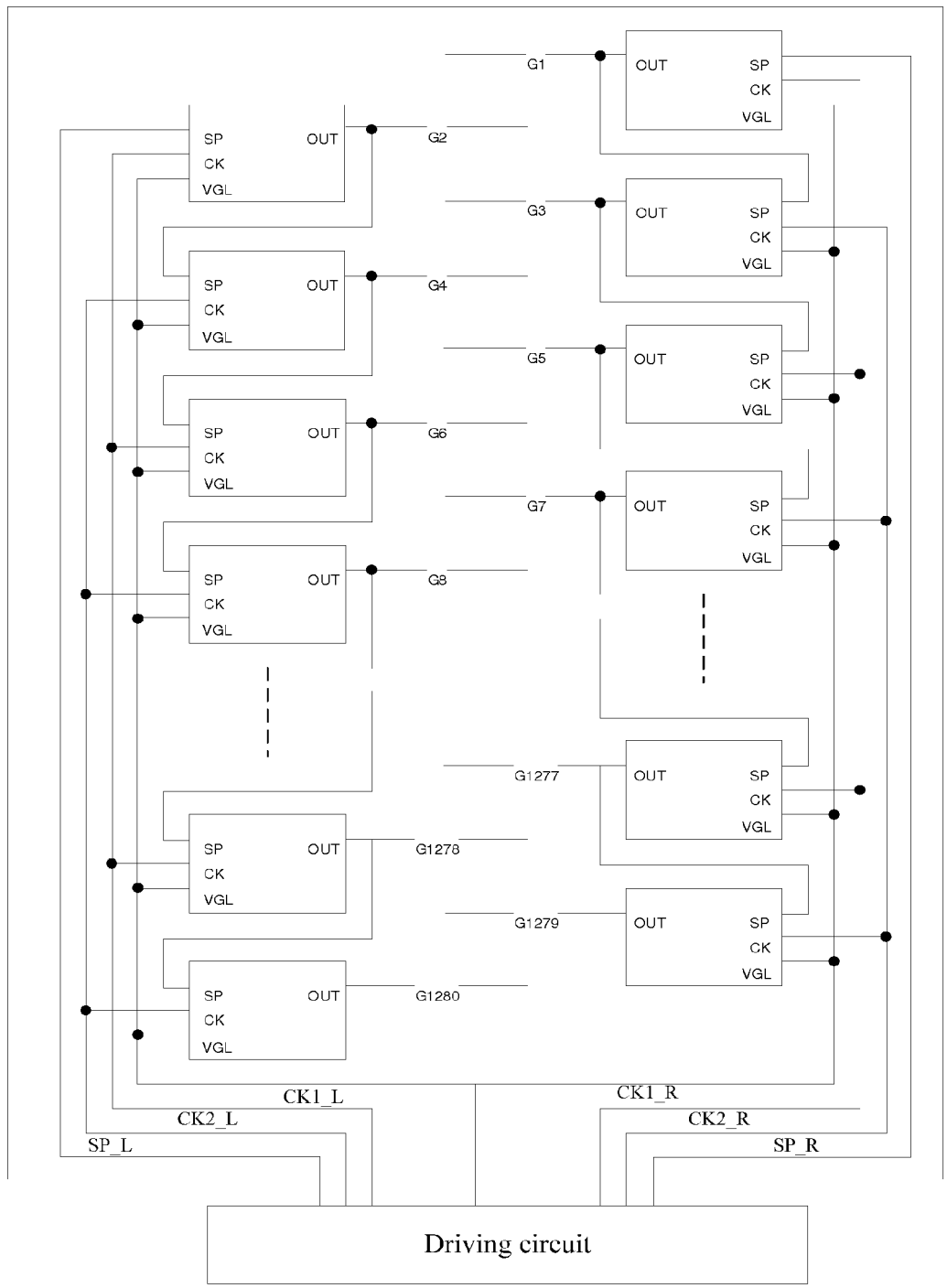
FIG. 10 is a schematic diagram of a scan driving circuit.
Figure 11:
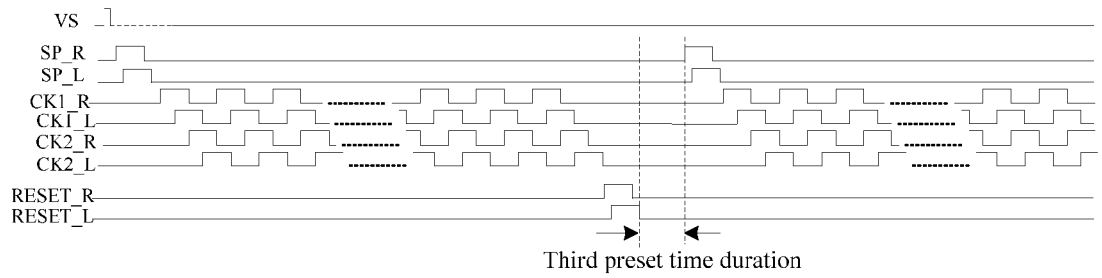
FIG. 11 schematically shows signals generated by the driving circuit shown in FIG. 9.

FIG. 9 is a schematic diagram of a driving circuit according to a third embodiment of the disclosure; FIG. 10 shows a scan driving circuit; and FIG. 11 schematically shows signals generated by the driving circuit shown in FIG. 9.

It should be noted that, in the embodiment, as shown in FIG. 10 the scan driving circuit includes a first scan driving sub-circuit (not labeled) for a progressive scanning along odd-numbered rows of scanning lines, and a second scan driving sub-circuit (not labeled) for a progressive scanning along even-numbered rows of scanning lines.

Similarities between the diving circuit in the embodiment and the driving circuit in the first embodiment are not described. The clock signal generating unit 202 of the driving circuit in the embodiment includes an initial pulse generating unit 2021 and a clock signal generating module 2022.

The initial pulse generating module 2021 is configured to generate a first initial pulse SP_L and a second initial pulse SP_R. At a beginning of the display of each frame of image, the first initial pulse SP_L and the second initial pulse SP_R are locked in a shift register RS Cell connected to scanning lines G1 and G2, and are transferred to a shift register RS Cell located at a next row during a subsequent scanning along other scanning lines until one frame is scanned.

The clock signal generating module 2022 is configured to generate a first clock signal CK1_R, a second clock signal CK1_L, a third clock signal CK2_R and a fourth clock signal CK2_L based on the first initial pulse SP_L and the second initial pulse SP_R. The clock signal generating module 2022 starts to sequentially output the first clock signal CK1_R, the second clock signal CK1_L, the third clock signal CK2_R and the fourth clock signal CK2_L after the initial pulse generating module 2021 outputs the first initial pulse SP_L and the second initial pulse SP_R.

The first clock signal CK1_R and the third clock signal CK2_R are for triggering the first scan driving sub-circuit to perform the progressive scanning along the odd-numbered rows of scanning lines, and the second clock signal CK1_L and the fourth clock signal CK2_L are for triggering the second scan driving sub-circuit to perform the progressive scanning along the even-numbered rows of scanning lines.

The first duration of the first level of one of the first clock signal CK1_R and the third clock signal CK2_R is identical with the duration of the second level of the other of the first clock signal CK1_R and the third clock signal CK2_R; and the first duration of the first level of one of the second clock signal CK1_L and the fourth clock signal CK2_L is identical with the duration of the second level of the other of the second clock signal CK1_L and the fourth clock signal CK2_L. The duration of the second level of the first clock signal CK1_R and the duration of the second level of the second clock signal CK1_L overlap each other, and the duration of the second level of the third clock signal CK2_R and the duration of the second level of the fourth clock signal CK2_L overlap each other. The control unit 103 is configured to control, during a process of displaying one frame of image by the display panel, the duration of the first level of each of the first clock signal CK1_R, the second clock signal CK1_L, the third clock signal CK2_R and the fourth clock signal CK2_L to be the second duration at least once.

The clock signal generating unit 202 of the driving circuit in the embodiment also includes a reset signal generating module 2023 for generating reset signals RESET_L and RESET_R. The reset signals RESET_L and RESET_R are for controlling the initial pulse generating module 2021 to output the initial pulses again after a third preset time duration; hence, the clock signal generating module 2022 may again output the first clock signal CK1_R, the second clock signal CK1_L, the third clock signal CK2_R and the fourth clock signal CK2_L after the pulse signals are output again. During the third preset time duration, the clock signal generating module 2022 outputs a low level lasting for the second duration. Therefore, during the third preset time duration, the scanning along the scanning lines is suspended, and noise generated by the electromagnetic interference is reduced.

The control unit 102 is connected to the reset signal generating module 2023, and is configured to control the reset signal generating module 2023 to generate the reset signals RESET_L and RESET_R at least once during the process of displaying one frame of image by the display panel; therefore, the duration of the first level of the clock signal output from the clock signal generating module 2022 is equal to the second duration, and the scanning along the scanning lines is suspended at least once during the process of displaying one frame of image, thereby solving the problem of the electromagnetic interference.

It should be noted that, in other embodiments, the first scan driving sub-circuit may be for the progressive scanning along the even-numbered rows of scanning lines, and the second scan driving sub-circuit may be for the progressive scanning along the odd-numbered rows of scanning lines.

Those skilled in the art may make changes and variations based on the embodiment shown in FIG. 9, FIG. 10 and FIG. 11.

Figure 12:
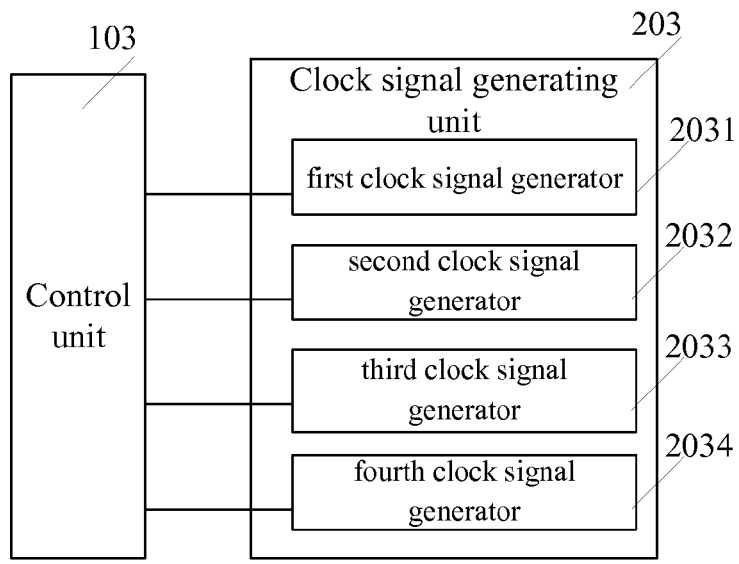
FIG. 12 is a schematic diagram of a driving circuit according to a fourth embodiment of the disclosure.
Figure 13:
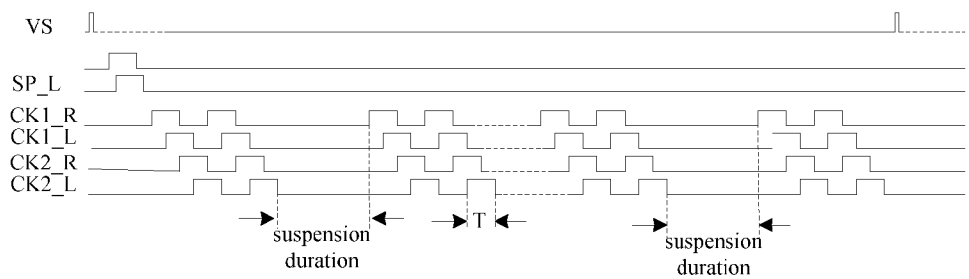
FIG. 13 schematically shows signals generated by the driving circuit shown in FIG. 12.

FIG. 12 is a schematic diagram of a driving circuit according to a fourth embodiment of the disclosure, and FIG. 13 schematically shows signals generated by the driving circuit in FIG. 12. In the embodiment, a clock signal generating unit 203 includes a plurality of clock signal generators for generating a plurality of clock signals. The clock signal generating unit 203 includes a first clock signal generator 2031, a second clock signal generator 2032, a third clock signal generator 2033 and a fourth clock signal generator 2034.

A first clock signal CK1_R, a second clock signal CK1_L, a third clock signal CK2_R and a fourth clock signal CK2_L have a same frequency and a same amplitude. With transitions from low levels to high levels sequentially output in the four clock signals and transitions from high levels to low levels sequentially output in the four clock signals, a scan driving circuit may provide scanning signals for four rows of scanning lines at a time, thereby achieving scannings along four scanning lines at a time, reducing time for scanning one frame of image, and improving the efficiency for displaying an image.

A control unit 103 is connected to the first clock signal generator 2031, the second clock signal generator 2032, the third clock signal generator 2033 and the fourth clock signal generator 2034, and is configured to control a duration of the low level of each of the first clock signal CK1_R, the second clock signal CK1_L, the third clock signal CK2_R and the fourth clock signal CK2_L to be a second duration at least once during the process of displaying one frame of image by the display panel 20.

As shown in FIG. 13, an interval between a falling edge of the fourth clock signal CK2_L and a rising edge of the first clock signal CK1_R is taken as an overlapping time duration of the first clock CK1_R, the second clock signal CK1_L, the third clock signal CK2_R and the fourth clock signal CK2_L, which is also defined as a suspension duration. During the suspension duration, the first clock signal generator 2031, the second clock signal generator 2032, the third clock signal generator 2033 and the fourth clock signal generator 2034 keeps in outputting the low level for a long period, and the scan driving circuit is not triggered to provide the scanning signals to any of the scanning lines, thereby avoiding the electromagnetic interference during the suspension duration and reducing the noise.

It should be noted that, the quantity of the clock signal generators in the clock signal generating unit 203 is not limited in the disclosure. The clock signal generating unit 203 may include one clock signal generator, or may include a plurality of clock signal generators in addition to four.

Figure 14:
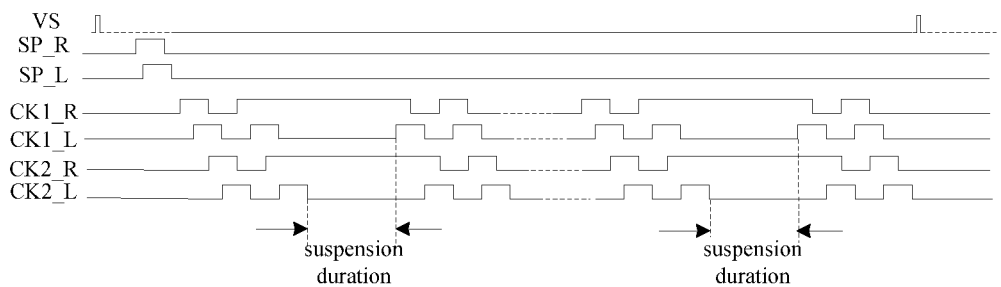
FIG. 14 schematically shows signals generated by the driving circuit shown in FIG. 12.

FIG. 14 shows signals generated by the driving circuit in FIG. 12.

In the embodiment, the control unit 103 is configured to control durations of respective high levels of the first clock signal CK1_R to be non-identical and control durations of respective high levels of the third clock signal CK2_R to be non-identical. The durations of respective high levels include a first duration and a second duration, the second duration being longer than the first duration. The control unit 103 is configured to control durations of the low levels of the second clock signal CK1_L and control durations of the low levels of the fourth clock signal CK2_L. The durations of the low levels include a third duration and a fourth duration, the fourth duration being longer than the third duration.

For the first clock signal CK1_R and the third clock signal CK2_R, a sum of a duration of the low level and the first duration of the high level equals a first clock time interval, and a sum of the duration of the low level and the second duration of the high level equals a second clock time interval.

For the second clock signal CK1_L and the fourth clock signal CK2_L, a sum of a duration of the high level and the third duration of the low level equals the first clock time interval, and a sum of the duration of the high level and the fourth duration of the low level equals the second clock time interval.

The control unit controls the duration of the high level of each of the first clock signal CK1_R and the third clock signal CK2_R to be the second duration at least once, and controls the duration of the low level of each of the second clock signal CK1_L and the fourth clock signal CK2_L to be the fourth duration at least once.

In the embodiment, a potential of the first level of the first clock signal CK1_R and the third clock signal CK2_R is identical with a potential of the second level of the second clock signal CK1_L and the fourth clock signal CK2_L, and a potential of the second level of the first clock signal CK1_R and the third clock signal CK2_R is identical with a potential of the first level of the second clock signal CK1_L and the fourth clock signal CK2_L.

In the embodiment, as shown in FIG. 14, an interval between a falling edge of the fourth clock signal CK2_L and a rising edge of the second clock signal CK1_L is defined as the suspension duration. During the suspension duration, the first clock signal CK1_R and the third clock signal CK2_R keep in outputting the high level, no transition from the high level to the low level occurs in the first clock signal CK1_R and the third clock signal CK2_R; while the second clock signal CK1_L and the fourth clock signal CK2_L keeps in outputting the low level, and no transition from the level to the high level occurs in the second clock signal CK1_L and the fourth clock signal CK2_L. Hence, the scan driving circuit may not be triggered to generate the scanning signal, the scanning along the scanning line is not performed, and accordingly, the signal in the scanning line of the display panel does not change, thereby reducing the influence generated by the electromagnetic interference.

The driving circuit of the disclosure may control the scan driving circuit to stop providing scanning signals to suspend the scanning along the scanning lines at least once during the process of displaying one frame of image, and a time duration during which the scanning along the scanning lines is suspended is defined as the suspension duration. The clock signal generated by the clock signal generating unit may control, after the suspension duration, the clock signal generating unit to generate a clock signal for triggering the scan driving circuit to provide the scanning signal to a next row of scanning line to perform the scanning. As shown in FIG. 6, during the process of displaying one frame of image, scannings along 1280 rows of scanning lines need to be performed. After the scanning along a 64-th row of scanning line is completed, the progressive scanning is suspended, then the progressive scanning is re-started from a 65-th row of scanning line; after the scanning along a 128-th row of scanning line is completed, the progressive scanning is suspended again, then the progressive scanning is re-started from a 129-th row of scanning line; . . . ; after the scanning along a 1216-th row of scanning line is completed, the progressive scanning is suspended again, then the progressive scanning is re-started from a 1217-th row of scanning line to a 1280-th row of scanning line; thereby achieving a display of one frame of image.

Figure 15:
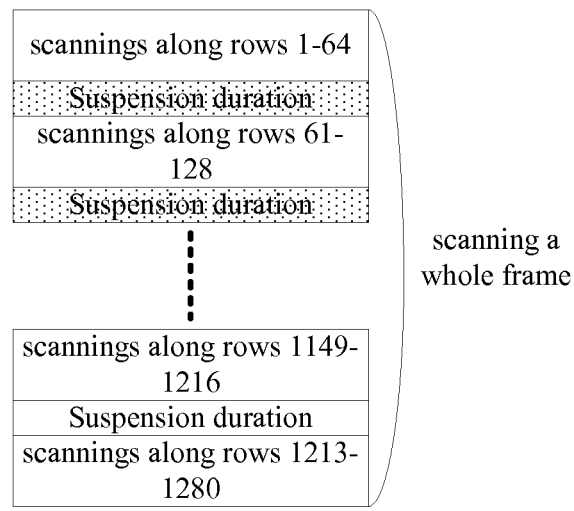
FIG. 15 is a schematic diagram showing a scanning performed by a driving circuit according to a fifth embodiment of the disclosure.

However, the disclosure does not limit the way for the scannings after the suspension duration. FIG. 15 is a schematic diagram showing a scanning performed by a driving circuit according to a fifth embodiment of the disclosure. A clock signal generated by a clock signal generating unit is configured to trigger a scan driving circuit to provide a scanning signal to at least one row of scanning line before the suspension duration, to perform the scanning along the scanning line. A control unit is configured to control, after the suspension duration, the clock signal generating unit to generate a clock signal for triggering the scan driving circuit to provide the scanning signal to re-start the scanning from at least from a last row of scanning lines along which the scannings are performed before the suspension. That is to say, for these scanning lines along which the scannings are performed before the suspension, the driving circuit performs twice scannings along some of those scanning lines; therefore, the suspension duration may be avoided from influencing the scanning along the scanning lines, and the quality of a displayed image is ensured.

As shown in FIG. 15, during a process of displaying one frame of image, scannings along 1280 rows of scanning lines need to be performed. After a scanning along a 64-th row of scanning line is completed, the progressive scanning is suspended, then the progressive scanning is re-started from a 61-th row of scanning line (i.e., the 61-th row of scanning line to the 64-th row of scanning line are scanned twice); after a scanning along a 128-th row of scanning line is completed, the progressive scanning is suspended again, then the progressive scanning is re-started from a 125-th row of scanning line (i.e., the 125-th row of scanning line to the 128-th row of scanning line are scanned twice); . . . ; after a scanning along a 1216-th row of scanning line is completed, the progressive scanning is suspended again, then the progressive scanning is re-started from a 1213-th row of scanning line (i.e., the 1213-th row scanning line to the 1216-th row of scanning line are scanned twice) to a 1280-th row of scanning line; thereby achieving the display of one frame of image.

It should be noted that, the scan driving circuit may be a circuit arranged on the display panel. For example, the scan driving circuit applies a Gate In Panel (GIP) technology, but the disclosure is not limited thereto. The scan driving circuit may be integrated in the driving circuit provided in the disclosure, that is to say, the driving circuit provided in the disclosure may include the scan driving circuit.

Correspondingly, a driving method is further provided in the disclosure. For describing the driving method more clearly, steps of the driving method are illustrated in detail in conjunction with the display apparatus and the driving circuits according to foregoing embodiments.

As shown in FIG. 1 and FIG. 2, a driving circuit 10 is configured to drive a display panel 20 to display an image. The display panel 20 includes a plurality of display units 201 and a plurality of scanning lines $G_1, G_2, \ldots, G_N$. Each of the scanning lines $G_1, G_2, \ldots, G_N$ is connected to a portion of the display units 201. The scanning lines $G_1, G_2, \ldots, G_N$ are configured to transmit scanning signals provided by a scan driving circuit 300 to the display units 201. The display units 201 connected to the scanning lines $G_1, G_2, \ldots, G_N$ are enabled to display the images according to the scanning signals.

The display panel 20 may be a liquid crystal display panel or other suitable panels, for example. Each display unit 201 includes a TFT and a pixel electrode connected to the TFT. The scanning lines $G_1, G_2, \ldots, G_N$ are connected to gate electrodes of the TFTs. The scanning signals provided by the scan driving circuit 300 are configured to turn on the TFTs respectively connected to the scanning lines $G_1, G_2, \ldots, G_N$, and the display units 201 connected to the scanning lines $G_1, G_2, \ldots, G_N$ are correspondingly activated. The data driving circuit provides data signals to pixel electrodes via the activated TFTs which. The display units 201 display the images according to the data signals.

The driving circuit includes the following steps:
generating clock signals;
where in each clock signal, first levels and second levels alternately occur; a potential of the first level is different from a potential of the second level; a transition from the first level to the second level, in the clock signal, is configured to trigger the scan driving circuit 300 to generate scanning signals. The transition from the first level to the second level is defined as an effective signal edge of a clock signal, and a time interval between two adjacent effective signal edges is defined as clock time interval; for example, if the first level is a low level and the second level is a high level, the effective signal edge is a rising edge; or if the first level is a high level and the second level is a low level, the effective signal edge is a falling edge; and
controlling the clock signal to have different clock time intervals;
where the clock time intervals include a first clock time interval and a second clock time interval, the second clock time interval being longer than the first clock time interval; and the clock time interval is controlled to be the second clock time interval at least once during a process of displaying one frame of image by the display panel.

Optionally, a duration of the second level of a generated clock signal is identical with a duration of the scanning signal provided by the scan driving circuit 300. The clock time interval of the clock signal may be controlled to be non-identical via controlling durations of the first levels to be non-identical.

Specifically, durations of the respective first levels output in the clock signal are controlled to be non-identical; and the durations of the first levels include a plurality of first duration and at least one second duration. The second duration is longer than the first duration. The duration of the first level is controlled to be the second duration at least once during the process of displaying one frame of image by the display panel 20. A sum of the first duration of the first level and the duration of the second level equals the first clock time interval, and a sum of the second duration of the first level and the duration of the second level equals the second clock time interval. In the embodiment, the second duration ranges from 9 μs to 400 μs, e.g., the second duration may be 200 μs.

As shown in FIG. 3, two clock signals CK1 and CK2 are generated. In the two clock signals CK1 and CK2, low levels and high levels are alternately output from the clock signal generating unit 201. The scan driving circuit 300 is triggered to generate the scanning signals at rising edges (transitions from the low level to the high level) of the clock signals CK1 and CK2. The rising edges are effective signal edges, and a time interval between two adjacent rising edges is taken as the clock time interval.

In the embodiment, the first levels of the two clock signals CK1 and CK2 are the low levels and the second levels are the high levels. The low levels are not configured to control the scan driving circuit to generate the scanning signal. The second levels are configured to drive the scan driving circuit to generate the scanning signal. In the embodiment, the low level ranges from −15V to −7.5V, e.g., the low level may be −12V. The high level ranges from 10V to 15V, e.g., the high level may be 15V.

In the embodiment, the first duration T1 of the low level of the clock signal CK1 is the identical with the duration of the high level of the clock signal CK2. That is to say, the first duration T1 of the low level of the clock signal CK1 equals a duration of generating a scanning signal from the scan driving circuit 300 driven by the clock signal CK2. Similarly, the first duration T1 of the low level of the clock signal CK2 is the identical with the duration of the high level of the clock signal CK1; that is to say, the first duration T1 of the low level of the clock signal CK2 is a duration of generating a scanning signal from the scan driving circuit 300 driven by the clock signal CK1. Accordingly, the scan driving circuit 300 may apply the scanning signals to the scanning lines connected to the scan driving circuit 300 to perform a progressive scanning.

The duration of the low level of the clock signals CK1 and CK2 may be controlled to be equal to the second duration T2, and the second duration T2 is longer than the first duration T1. An overlapping duration of the second durations T2 of the low levels of the clock signal CK1 and CK2 is defined as a suspension duration. No rising edge may occur in the clock signals CK1 and CK2 during the suspension duration, i.e., no transition from the low level to the high level may occur. Therefore, the scan driving circuit 300 may not be triggered to generate the scanning signals, and accordingly, the progressive scanning along the scanning lines is suspended.

As shown in FIG. 3, under driving of the clock signals CK1 and CK2, after the scanning lines $G_M$ and $G_{M+1}$ are scanned by the scanning signals generated by the scan driving circuit the scanning to the next scanning line $G_{M+2}$ is suspended to scan during the suspension duration. Until the second duration T2 of the clock signal CK1 terminates, a transition from the low level to the high level of the clock signal CK1 triggers the scan driving circuit 300 to apply the scanning signal to the scanning line $G_{M+2}$ to perform the scanning. Similarly, when the second duration T2 of the CK2 terminates, a transition from the low level to the high level triggers the scan driving circuit 300 to apply the scanning signal to the scanning line $G_{M+3}$ to perform the scanning.

That is to say, during the suspension durations, the display panel 20 suspends the progressive scanning along the scanning lines $G_1$, $G_2$, . . . , $G_N$. Accordingly, no or less electromagnetic interference may be generated in the display apparatus 1 due to suspension of scanning the scanning lines $G_1$, $G_2$, . . . , $G_N$. Therefore, other electronic apparatuses integrated with the display apparatus 1 may perform precise operations such as a detection without much electromagnetic interference during the suspension duration.

It should be noted that, the duration of the high level of the clock signals CK1 and CK2 equals the duration of the scanning signal. In other embodiments, the durations of the high levels of the clock signals include a plurality of first durations and at least one second duration longer than the first durations, and the durations of the low levels of the clock signals CK1 and CK2 are identical. Accordingly, the scanning signal is applied to a current scanning line to perform the scanning for a long time when the duration of the high level of the clock signals CK1 and CK2 is the second duration. Furthermore, since the scanning signal on the scanning line keeps unchanged during the long time, no or less electromagnetic interference is generated and accordingly, the noise may be reduced.

Similarly, in other embodiments, the scan driving circuit 300 may be triggered by a falling edge of the clock signal (a transition from the high level to the low level) to generate the scanning signal, and the duration of the high level of the clock signals is controlled to be equal to the second duration. That is to say, no falling edge occurs during a long period in the clock signals. Accordingly, the scan driving circuit 300 is not triggered by the clock signals to generate the scanning signal during the long period. Therefore, no scanning signal is transmitted to the scanning line on the display panel 20 during the long period, i.e., the progressive scanning along the scanning lines is suspended during the long period, thereby reducing the noise generated by the electromagnetic interference.

Alternatively, the durations of the low levels of the clock signals may equal the durations of the scanning signals, correspondingly. The duration of the low levels of the clock signals output from the clock signal generating unit 200 include a plurality of first durations and at least one second duration longer than the first durations. When one of the durations of the low levels of the clock signals CK1 and CK2 equals to the second duration, the scanning signal is applied to a current scanning line during a long period to perform the scanning. Since the scanning signal is applied to the scanning line keeps unchanged during the long period, noise generated by the electromagnetic interference may also be reduced.

As shown in FIG. 2 and FIG. 3, during the process of displaying one frame of image by the display panel 20, the driving circuit 10 in the embodiment may suspend the scanning along the scanning lines $G_1$, $G_2$, . . . , $G_N$ one or more times; and suspension quantities, suspension durations and suspension positions may be preset in advance.

It should be noted that, as shown in FIG. 3, the duration of the second level of the clock signals CK1 and CK2 is the identical with the duration of the scanning signal generated by the scan driving circuit 300, while the disclosure is not limited thereto, in other embodiments, a sum of the durations of the first level and the second level of each of the clock signals CK1 and CK2 may be the identical with the duration of the scanning signal generated by the scan driving circuit 300.

Correspondingly, the durations of the respective first levels of the clock signal are controlled to be non-identical, and the durations of the respective second levels of the clock signal are controlled to be identical. The durations of the respective first levels include a plurality of first duration and at least one second duration, the second duration being longer than the first duration. The duration of the first level is controlled to be the second duration at least once during the process of displaying one frame of image by the display panel 20. A sum of the first duration of the first level and the duration of the second level equals the first clock time interval, and a sum of the second duration of the first level and the duration of the second level equals the second clock time interval. That is to say, the clock time intervals may be controlled to be non-identical via controlling the duration of the first levels to be non-identical.

Alternatively, the durations of the respective second levels of the clock signal are controlled to be non-identical and the durations of the respective first levels of the clock signal are controlled to be identical. The durations of the respective second levels include a plurality of first duration and at least one second duration, the second duration being longer than the first duration. The duration of the second level is controlled to be the second duration at least once during the process of displaying one frame of image is displayed by the display panel 20. A sum of the first duration of the second level and the duration of the first level equals the first clock time interval, and a sum of the second duration of the second level and the duration of the first level equals the second clock time interval. That is to say, the clock time intervals may be controlled to be non-identical via controlling the duration of the second levels to be non-identical.

The interval between two adjacent effective signal edges may be increased by controlling the clock time interval. Accordingly, the scan driving circuit 300 may not be triggered to generate the scanning signal during a long period, or the scanning signal is applied to the current scanning line to perform the scanning for a long period. Therefore, the scanning signal applied to the scanning line keeps unchanged during the long period, no or less electromagnetic interference is generated, and accordingly, noise may be reduced.

As shown in FIG. 4, a driving circuit includes a scan driving unit 301, a vertical synchronization signal unit 302, a control unit 101, and a clock signal generating unit 202. The control unit 101 is connected to the scan driving unit 301, the vertical synchronization signal unit 302, and the clock signal generating unit 202. It should be noted that, the scanning lines are configured to enable a display of respective frames of image based on a vertical synchronization signal VS. A scan driving circuit 301 is configured to provide a horizontal synchronization signal HS_GIP. With the driving method in the embodiment, a suspension position of a scanning may be determined based on the vernal synchronization signal VS and the horizontal synchronization signal HS_GIP.

The driving method of the embodiment includes: determining, based on the vertical synchronization signal VS and the horizontal synchronization signal HS_GIP, whether to control a duration of a first level of a clock signal CK to be equal to a second duration. That is to say, in the driving method in the embodiment, a suspension position for setting a suspension duration is determined based on the vertical synchronization signal VS and the horizontal synchronization signal HS_GIP.

For example, during a process of displaying one frame of image, 1280 rows of the scanning lines need to be scanned. After the vertical synchronization signal VS is received, the duration of the first level of the clock signal CK is controlled to be equal to the second duration at intervals of receiving every 64 horizontal synchronization signals HS_GIP. Accordingly, the suspension durations during which the progressive scanning along the scanning lines is suspended are formed, and 19 suspension durations are formed during the process of displaying one frame of image.

However, the disclosure does not limit whether to set the suspension durations based on the vertical synchronization signal VS and the horizontal synchronization signal HS_GIP. In other embodiments, positions for setting the suspension durations may be determined in other ways and the suspension durations may be generated through a control. The positions for generating the suspension durations may be determined based on time. For example, the scanning from a first row of scanning line to a 1280-th row of scanning line needs 10 ms, the duration of the first level of the clock signal CK may be controlled to be equal to the second duration at a time instant when the scanning is performed for 5 ms; hence, a progressive scanning along the scanning lines is suspended between a 641-th row of scanning line and a 642-th row of scanning line.

As shown in FIG. 5 and FIG. 6, a step of controlling at least one duration of one of the first level and the second level of the clock signal to be longer than other durations during the process of displaying one frame of image by the display panel 20 includes:

determining whether a received horizontal synchronization signal HS_GIP meets a preset row information after one vertical synchronization signal VS is received.

The preset row information is, row information of the scanning lines under a condition that the clock time interval is controlled to be the second clock time interval, and the preset row information may be set in advance.

In the embodiment, the preset row information is, row information of the scanning lines under a condition that the duration of the first level of the clock signal CK is controlled to be equal to the second duration, while the disclosure is not limited thereto. In other embodiments, the preset row information may be, row information of the scanning lines under a condition that the duration of the second level of the clock signal is controlled to be a long period.

For example, during the process of displaying one frame of image, scanning signals need to be applied to 1280 rows of scanning lines to perform the progressive scanning. The preset row information is, row information of the scanning lines under a condition that the duration of the first level of the clock signal is controlled to be the second duration after the scannings along the 64-th row of scanning line, along a 128-th row of scanning line, . . . , along a 1216-th row of scanning line are completed; hence, respective suspension durations for pausing the progressive scanning along the scanning lines are set after the scanning along the 64-th row of scanning line and before the scanning along the 65-th row of the scanning line, after the scanning along the 128-th row of scanning line and before the scanning along a 129-th scanning line, . . . , and after the scanning along the 1216-th row of the scanning line and before the scanning along a 1217-th row of scanning line.

It may be determined, by a determination module 1012, whether the horizontal synchronization signal HS_GIP meets the preset row information. For example, the preset row information is configured to control the duration of the first level of the clock signal CK to be equal to the second duration after the scanning along the 64-th row of scanning line is completed, to suspend the progressive scanning along the scanning lines for one suspension duration. After the vertical synchronization signal VS is received, it is determined that the horizontal synchronization signal HS_GIP does not meet the preset row information before 64-th horizontal synchronization signal HS_GIP sent from the scan driving circuit 301 is received; and it is determined that the horizontal synchronization signal HS_GIP meets the preset row information when the 64-th horizontal synchronization signal HS_GIP sent from the scan driving circuit 301 is received.

The duration of the first level of the clock signal is controlled to be equal to the second duration, in the case that the determination module 1012 determines that the horizontal synchronization signal HS_GIP meets the preset row information.

For example, in the clock signal, high levels and low levels alternately occur, and rising edges in the clock signal are for triggering the scan driving circuit 301 to generate the scanning signals. The duration of the low level of the clock signal is controlled to be equal to the second duration in the case that the determination module 1012 determines that the horizontal synchronization signal HS_GIP meets the preset row information; hence, during a long period, no rising edge occurs and the scan driving circuit 301 may not be triggered to generate the scanning signal, thereby reducing noise generated by the electromagnetic interference.

It should be noted that, the clock signal may be controlled in multiple ways.

In conjunction with signals show in FIG. 7, the horizontal synchronization signal HS_GIP is sent, and the clock signal CK is generated based on the horizontal synchronization signal HS_GIP.

The clock signal includes a first clock signal CK1_R, a second clock signal CK1_L, a third clock signal CK2_R and a fourth clock signal CK2_L; hence, the scan driving circuit 301 generates scanning signals respectively provided for four scanning lines. As shown in FIG. 7, the horizontal synchronization signal HS_GIP includes a plurality of square wave signals sequentially triggering generations the first clock signal CK1_R, the second clock signal CK1_L, the third clock signal CK2_R and the fourth clock signal CK2_L. Specifically, in the embodiment, falling edges of the square wave signals are for triggering the generations of the clock signals.

Providing the horizontal synchronization signal HS_GIP is stopped for a first preset time duration in the case that the determination module 1012 determines that the horizontal synchronization signal HS_GIP meets the preset row information.

In FIG. 7, rising edges in the first clock signal CK1_R, the second clock signal CK1_L, the third clock signal CK2_R and the fourth clock signal CK2_L are for triggering the scan driving circuit 301 to generate the scanning signals. Sending the horizontal synchronization signal HS_GIP corresponding to a next row of scanning line (for example, the 65-th row of scanning line) is stopped for the first preset time duration in the case that it is determined that the horizontal synchronization signal HS_GIP meets the preset row information (for example it is determined that the horizontal synchronization signal HS_GIP is the horizontal synchronization signal HS_GIP for the 64-th row of scanning line). During the first preset time duration, since the horizontal synchronization signal HS_GIP for a next row of scanning line (for example the 65-th row of scanning line) is not received, the clock signal may not be generated; therefore, the scan driving circuit 301 may not be triggered to generate the scanning signal for the scanning along the next row of scanning line (for example the 65-th row of scanning line), and accordingly, noise caused by the electromagnetic interference is reduced. When the first preset time duration terminates, the horizontal synchronization signal HS_GIP corresponding to the next row of scanning line (for example the 65-th row of scanning line) is sent, thereby achieving the scanning along the next row of scanning line (for example the 65-th row of scanning line).

In FIG. 7, an interval between the falling edge of CK2_L and the rising edge of CK1_R is taken as an overlapping time duration of the first clock signal CK1_R, the second clock signal CK1_L, the third clock signal CK2_R and the fourth clock signal CK2_L, which is defined as the suspension duration; and during the suspension duration the scan driving circuit 301 suspends the progressive scanning along the scanning lines.

The clock signal may be controlled in other ways, and reference may be made in conjunction with signals shown in FIG. 8. In the embodiment, the clock signal may be controlled by a stop signal STOP.

Specifically, the stop signal STOP is generated in the case that it is determined that the horizontal synchronization signal HS_GIP meets the preset row information. The stropping signal STOP includes an ineffective signal and an effective signal, where the ineffective signal does not influence the step of generating the clock signal, a switch from the ineffective signal to the effective signal is configured to trigger a control for the clock signal, and a duration of the effective signal is associated with the second duration of the first level of the clock signal.

In the embodiment, the stop signal is a square wave signal having a third level (a low level) and a fourth level (a high level), and a potential of the third level is different from a potential of the fourth level. The low level is the ineffective signal and the high level is the effective signal. As shown in FIG. 8, after the stop signal STOP switches from the low level to the high level, a third clock signal CK2_R and a fourth clock signal CK2_L are output based on S1 and S2 in the horizontal synchronization signal; then no clock signal CK is output, and the suspension duration for pausing the scanning along the scanning lines occurs. That is to say, in the embodiment, the duration of the first level of the output CK2_L is controlled to be equal to the second duration after a second preset time duration is elapsed from the switch of the stop signal STOP from the ineffective signal (the low level) to the effective signal (the high level). The suspension duration is the interval between the falling edge of the CK2_L and the rising edge of the CK1_R.

As shown in FIG. 8, the clock signal CK (specifically, the first clock signal CK1_R) is output immediately when the stropping signal STOP is switched from the effective signal (the high level) to the ineffective signal (the low level). That is to say, the first duration is recovered as the duration of the first level immediately when the stop signal STOP is switched from the effective signal to the ineffective signal.

However, the disclosure is not limited thereto, in other embodiments, the duration of the output first level may be controlled to be equal to the second duration immediately when the stop signal is switched from the ineffective signal to the effective signal; or the first duration is recovered as the duration of the first level after a preset time duration is elapsed from a switch of the stop signal STOP from the effective signal to the ineffective signal.

In addition, the disclosure does not limit the form of the stop signal STOP; in addition to the square wave signal, the stop signal STOP may be a stepped signal, a trapezoid signal, etc.

Reference may be made to FIG. 9, FIG. 10 and FIG. 11. The scan driving circuit shown in FIG. 10 includes first scan driving sub-circuit (not labeled) for a progressive scanning along odd-numbered rows of scanning lines, and a second scan driving sub-circuit (not labeled) for a progressive scanning along even-numbered rows of scanning lines. The step of generating the clock signal includes:

generating a first initial pulse SP_L and a second initial pulse SP_R; where at a beginning of the display of each frame of image, the first initial pulse SP_L and the second initial pulse SP_R are locked in a shift register RS Cell connected to scanning lines G1 and G2, and are transferred to a shift register RS Cell located at a next row during a subsequent scanning along other scanning lines until one frame is scanned; and generating a first clock signal CK1_R, a second clock signal CK1_L, a third clock signal CK2_R and a fourth clock signal CK2_L based on the first initial pulse SP_L and the second initial pulse SP_R; where the first clock signal CK1_R, the second clock signal CK1_L, the third clock signal CK2_R and the fourth clock signal CK2_L are sequentially output after an initial pulse generating module 2021 outputs the first initial pulse SP_L and the second initial pulse SP_R.

The first clock signal CK1_R and the third clock signal CK2_R are for triggering the first scan driving sub-circuit to perform the progressive scanning along the odd-numbered rows of scanning lines, and the second clock signal CK1_L and the fourth clock signal CK2_L are for triggering the second scan driving sub-circuit to perform the progressive scanning along the even-numbered rows of scanning lines.

The first duration of the first level of one of the first clock signal CK1_R and the third clock signal CK2_R is identical with the duration of the second level of the other of the first clock signal CK1_R and the third clock signal CK2_R; and the first duration of the first level of one of the second clock signal CK1_L and the fourth clock signal CK2_L is identical with the duration of the second level of the other of the second clock signal CK1_L and the fourth clock signal CK2_L. The duration of the second level of the first clock signal CK1_R and the duration of the second level of the second clock signal CK1_L overlap each other, and the duration of the second level of the third clock signal CK2_R and the duration of the second level of the fourth clock signal CK2_L overlap each other. During a process of displaying one frame of image by the display panel 20, the duration of the first level of each of the first clock signal CK1_R, the second clock signal CK1_L, the third clock signal CK2_R and the fourth clock signal CK2_L is controlled to be the second duration at least once.

During the process of displaying one frame of image by the display panel 20, reset signals RESET_L and RESET_R are generated at least once. The reset signals RESET_L and RESET_R are for outputting the initial pulses again after a third preset time duration; hence, a clock signal generating module 2022 may again output the first clock signal CK1_R, the second clock signal CK1_L, the third clock signal CK2_R and the fourth clock signal CK2_L after the pulse signals are output again. During the third preset time duration, a low level of each clock signal lasts for the second duration. Therefore, during the third preset time duration, the scanning along the scanning lines is suspended, and noise generated by the electromagnetic interference is reduced.

As shown in FIG. 12 and FIG. 13, the step of generating the clock signal includes: generating a plurality of clock signals. Specifically, the clock signals include the first clock signal CK1_R, the second clock signal CK1_L, the third clock signal CK2_R and the fourth clock signal CK2_L.

The first clock signal CK1_R, the second clock signal CK1_L, the third clock signal CK2_R and the fourth clock signal CK2_L have a same frequency and a same amplitude. With transitions from low levels to high levels sequentially output in the four clock signals and transitions from high levels to low levels sequentially output in the four clock signals, a scan driving circuit may provide scanning signals for four rows of scanning lines at a time, thereby achieving scannings along four scanning lines at a time, reducing time for scanning one frame of image, and improving the efficiency for displaying an image.

A duration of the low level of each of the first clock signal CK1_R, the second clock signal CK1_L, the third clock signal CK2_R and the fourth clock signal CK2_L is controlled to be the second duration at least once during the process of displaying one frame of image by the display panel 20.

As shown in FIG. 13, an interval between a falling edge of the fourth clock signal CK2_L and a rising edge of the first clock signal CK1_R is taken as an overlapping time duration of the first clock CK1_R, the second clock signal CK1_L, the third clock signal CK2_R and the fourth clock signal CK2_L, which is also defined as a suspension duration. During the suspension duration, the low level is hold for a long period, and the scan driving circuit is not triggered to provide the scanning signals to any of the scanning lines, thereby avoiding the electromagnetic interference during the suspension duration and reducing the noise.

It should be noted that, in other embodiments, the first scan driving sub-circuit may be for the progressive scanning along the even-numbered rows of scanning lines, and the second scan driving sub-circuit may be for the progressive scanning along the odd-numbered rows of scanning lines. Those skilled in the art may make changes and variations to the embodiment shown in FIG. 9, FIG. 10 and FIG. 11.

FIG. 14 shows signals generated by the driving circuit in FIG. 12.

Durations of respective high levels of the first clock signal CK1_R are controlled to be non-identical and durations of respective high levels of the third clock signal CK2_R are controlled to be non-identical. The durations of respective high levels include a first duration and a second duration, the second duration being longer than the first duration. In addition, durations of the low levels of the second clock signal CK1_L and durations of the low levels of the fourth clock signal CK2_L are controlled to be identical. The durations of the low levels include a third duration and a fourth duration, the fourth duration being longer than the third duration.

For the first clock signal CK1_R and the third clock signal CK2_R, a sum of the duration of the low level and the first duration of the high level equals to a first clock time interval, and a sum of the duration of the low level and the second duration of the high level equals a second clock time interval.

For the second clock signal CK1_L and the fourth clock signal CK2_L, a sum of the duration of the high level and the third duration of the low level equals the first clock time interval, and a sum of the duration of the high level and the fourth duration of the low level equals the second clock time interval.

In the driving method in the embodiment, the duration of the high level of each of the first clock signal CK1_R and the third clock signal CK2_R is controlled to be the second duration at least once, and the duration of the low level of each of the second clock signal CK1_L and the fourth clock signal CK2_L is controlled to be the fourth duration at least once.

In the embodiment, a potential of the first level of the first clock signal CK1_R and the third clock signal CK2_R is identical with a potential of the second level of the second clock signal CK1_L and the fourth clock signal CK2_L, and a potential of the second level of the first clock signal CK1_R and the third clock signal CK2_R is identical with a potential of the first level of the second clock signal CK1_L and the fourth clock signal CK2_L.

In the embodiment, as shown in FIG. 14, an interval between a falling edge of the fourth clock signal CK2_L and a rising edge of the second clock signal CK1_L is defined as the suspension duration. During the suspension duration, the first clock signal CK1_R and the third clock signal CK2_R keep in outputting the high level, no transition from the high level to the low level occurs in the first clock signal CK1_R and the third clock signal CK2_R; while the second clock signal CK1_ L and the fourth clock signal CK2_L keeps in outputting the low level, and no transition from the level to the high level occurs in the second clock signal CK1_L and the fourth clock signal CK2_L. Hence, the scan driving circuit may not be triggered to generate the scanning signal, the scanning along the scanning line is not performed, and accordingly, the signal in the scanning line of the display panel does not change, thereby reducing the influence generated by the electromagnetic interference.

With the driving method in the disclosure, the scan driving circuit stops providing scanning signals to suspend the scanning along the scanning lines at least once during the process of displaying one frame of image, and a time duration during which the scanning along the scanning lines is suspended is defined as the suspension duration. After the suspension duration, the scan driving circuit provides the scanning signal to a next row of scanning line to perform the scanning. As shown in FIG. 6, during the process of displaying one frame of image, scannings along 1280 rows of scanning lines need to be performed. After the scanning along a 64-th row of scanning line is completed, the progressive scanning is suspended, then the progressive scanning is re-started from a 65-th row of scanning line; after the scanning along a 128-th row of scanning line is completed, the progressive scanning is suspended again, then the progressive scanning is re-started from a 129-th row of scanning line; . . . ; after the scanning along a 1216-th row of scanning line is completed, the progressive scanning is suspended again, then the progressive scanning is re-started from a 1217-th row of scanning line to a 1280-th row of scanning line; thereby achieving a display of one frame of image.

However, the disclosure does not limit the way for the scannings after the suspension duration. As shown in FIG. 15, a scan driving circuit provides a scanning signal to at least one row of scanning line before the suspension duration, to perform the scanning along the scanning line; after the suspension duration, the scan driving circuit provides the scanning signal to re-start the scanning from at least from a last row of scanning lines along which the scannings are performed before the suspension. That is to say, for these scanning lines along which the scannings are performed before the suspension, the driving circuit performs twice scannings along some of those scanning lines; therefore, the suspension duration may be avoided from influencing the scanning along the scanning lines, and the quality of a displayed image is ensured.

As shown in FIG. 15, during a process of displaying one frame of image, scannings along 1280 rows of scanning lines need to be performed. After a scanning along a 64-th row of scanning line is completed, the progressive scanning is suspended, then the progressive scanning is re-started from a 61-th row of scanning line (i.e., the 61-th row of scanning line to the 64-th row of scanning line are scanned twice); after a scanning along a 128-th row of scanning line is completed, the progressive scanning is suspended again, then the progressive scanning is re-started from a 125-th row of scanning line (i.e., the 125-th row of scanning line to the 128-th row of scanning line are scanned twice); . . . ; after a scanning along a 1216-th row of scanning line is completed, the progressive scanning is suspended again, then the progressive scanning is re-started from a 1213-th row of scanning line (i.e., the 1213-th row scanning line to the 1216-th row of scanning line are scanned twice) to a 1280-th row of scanning line; thereby achieving the display of one frame of image.

Correspondingly, a display apparatus is further provided in the disclosure. As shown in FIG. 2, the display apparatus includes a display panel 20 and a driving circuit 10.

The display panel 20 includes a plurality of display units 201 and a plurality of scanning lines $G_1, G_2, \ldots, G_N$. Each of the scanning lines $G_1, G_2, \ldots, G_N$ is connected to a plurality of display units 201. The scanning lines $G_1, G_2, \ldots, G_N$ are configured to transmit scanning signals, which are provided by a scan driving circuit 300, to the display units 201 to enable the display units 201 connected to the scanning lines $G_1, G_2, \ldots, G_N$ to display the image.

The driving circuit 10 is configured to drive the display panel 20 to display the image, and the driving circuit 10 is the driving circuit according to foregoing embodiments of the disclosure. Contents identical with the related embodiments of the driving circuits are not described here.

With the display apparatus provided in the disclosure, display of an image may be achieved; and a scanning is suspended at least once during a process of displaying one frame of image; therefore, the electromagnetic interference is small when the scanning is suspended, other electronic apparatuses integrated with the display apparatus may work when the scanning is suspended (for example, a touch apparatus performs a touch detection when the scanning is suspended), and mutual interferences between the display apparatus and other electronic apparatuses are reduced.

Optionally, based on the GIP technology, the scan driving circuit 201 may be arranged on the display panel 20. However, the disclosure does not limit thereto, the scan driving circuit 201 may be integrated in the driving circuit provided in the disclosure.

Optionally, the display panel 20 may be a liquid crystal display panel, but the disclosure does not limit the type of the display panel 20.

Optionally, the display apparatus further includes a touch panel (not shown in FIG. 2) and a touch detection circuit connected to the touch panel. The touch detection circuit performs a touch detection on the touch panel during a suspension duration, thereby reducing the influence on the touch detection from the electromagnetic interference.

Specifically, the touch panel is an out-cell touch panel or an embedded touch panel.

Figure 16:
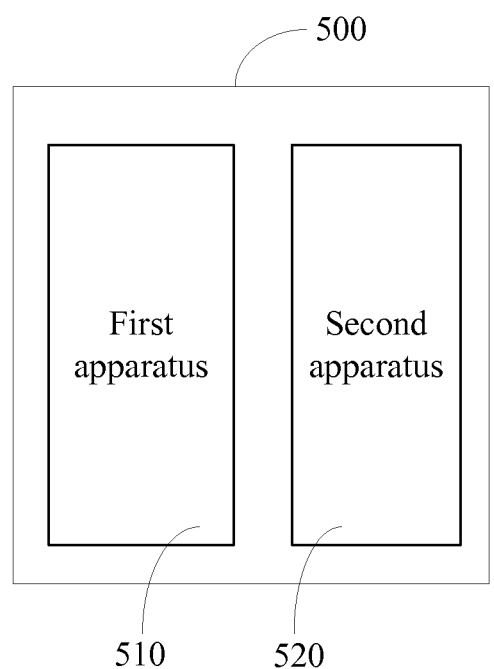
FIG. 16 is a schematic diagram of an electronic apparatus according to an embodiment of the disclosure.

Correspondingly, an electronic apparatus is further provided in the disclosure. FIG. 16 is a schematic diagram of an electronic apparatus according to an embodiment of the disclosure. The electronic apparatus 500 includes a first apparatus 510 and a second apparatus 520. The first apparatus 510 is a display apparatus, the second apparatus 520 works when the first apparatus 510 suspends a scanning, thereby reducing the electromagnetic interference on the second apparatus 520 from the display apparatus.

The electronic apparatus may be a mobile phone, a tablet computer, a notebook computer or a desktop-computer.

Furthermore, in the case that the second apparatus 520 is a touch apparatus, the touch apparatus includes a touch panel and a touch detection circuit connected to the touch panel. The touch detection circuit performs a touch detection on the touch panel when the display apparatus suspends the scanning.

The touch apparatus may be included in the display apparatus. The touch panel may be a panel independent from the display panel, or may be an embedded touch panel. The embedded touch panel includes an on-cell touch panel and an in-cell touch panel. The touch detection circuit may be integrated with the driving circuit of the display apparatus.

In the electronic apparatus provided in the disclosure, the display apparatus generates little electromagnetic interference on other electronic apparatuses (for example a touch apparatus) in the case of pausing the scanning, other electronic apparatuses may work during the suspension duration;

hence, the mutual interferences between the display apparatus and other electronic apparatuses are reduced, and the integration level of the electronic apparatus is improved.

Another electronic apparatus is further provided in the disclosure. The electronic apparatus includes a display apparatus. The display apparatus includes: a display panel, including a plurality of display units and a plurality of scanning lines. Each scanning line is connected to a plurality of display units. The scanning lines are configured to transmit scanning signals, which are provided by a scan driving circuit, to the display units to enable the display units connected to the scanning lines to display an image.

The display apparatus also includes a driving circuit for driving the display panel to display an image, and the driving circuit is the driving circuit according to foregoing embodiments of the disclosure.

Optionally, the scan driving circuit is arranged on the display panel. The display panel may be a liquid crystal display panel.

Specifically, the electronic apparatus may be a mobile phone, a tablet computer, a notebook computer or a desktop computer.

With the electronic apparatus provided in the disclosure, the influence of the electromagnetic interference may be reduced.

Although the disclosure is disclosed as above, it is not limited thereto. Those skilled in the art may make various modifications and changes without departing from the spirit and scope of the disclosure; hence, the scope of protection of the disclosure should be in accordance with the scope defined by claims.

The invention claimed is:

1. A driving circuit, for driving a display panel to display an image; the display panel comprising a plurality of display units and a plurality of scanning lines; each scanning line connected to a plurality of display units; the scanning lines configured to transmit scanning signals provided by a scan driving circuit to the display units; the display units being activated to display the image, based on the scanning signals;

the driving circuit comprising:
a clock signal generating unit, configured to generate clock signals, each of the clock signals comprising a plurality of first levels and a plurality of second levels, wherein the first levels and second levels are alternately output, a potential of each first level is different from a potential of each second level, transitions from each first level to each second level are for triggering the scan driving circuit to generate the scanning signals, the transitions from each first level to each second level are defined as effective signal edges of the clock signals, and an interval between adjacent effective signal edges is defined as a clock time interval; and
a control unit, configured to control the clock time intervals of each clock signal to be non-identical, the clock time intervals comprising a first clock time interval and a second clock time interval, the second clock time interval being longer than the first clock time interval; and the control unit further configured to control the clock time interval to be the second clock time interval at least once during a process of displaying one frame of image by the display panel, wherein the clock signal generating unit comprises:
an initial pulse generating module configured to generate an initial pulse;
a clock signal generating module configured to generate the clock signal based on the initial pulse; and
a reset signal generating module configured to generate a reset signal, wherein the reset signal is for controlling the initial pulse generating module to output the initial pulse again after a third preset time duration;
and wherein the control unit is connected to the reset signal generating module, and is configured to control the reset signal generating module to generate the reset signal at least once during the process of displaying one frame of image by the display panel, to make the clock time interval of the clock signal output from the clock signal generating module to be equal to the second clock time interval.

2. The driving circuit according to claim 1, wherein a duration of each second level of each clock signal generated by the clock signal generating unit is identical with a duration of the scanning signal generated by the scan driving circuit;
the control unit is configured to control durations of the respective first levels of the clock signal to be non-identical, the durations of the respective first levels comprising a first duration and a second duration, and the second duration is longer than the first duration;
the control unit is further configured to control the duration of the first level to be the second duration at least once during the process of displaying one frame of image by the display panel; and
a sum of the first duration of the first level and the duration of the second level equals the first clock time interval, and a sum of the second duration of the first level and the duration of the second level equals the second clock time interval.

3. The driving circuit according to claim 2, wherein the clock signal generating unit is configured to generate two clock signals;
the first duration of the first level of one of the two clock signals is identical with the duration of the second level of the other of the two clock signals; and
the control unit is configured to control the duration of the first level to be the second duration at least once for each of the two clock signals during the process of displaying one frame of image by the display panel.

4. The driving circuit according to claim 2, wherein the scan driving circuit comprises a first scan driving sub-circuit configured to perform a progressive scanning along a first set of scanning lines, and a second scan driving sub-circuit configured to perform a progressive scanning along a second set of scanning lines; the first set of scanning lines are alternately arranged with the second set of scanning lines;
the clock signal generating unit is configured to generate a first clock signal, a second clock signal, a third clock signal, and a fourth clock signal; the first clock signal and the third clock signal are for triggering the first scan driving sub-circuit to perform the progressive scanning along the first set of scanning lines, and the second clock signal and the fourth clock signal are for triggering the second scan driving sub-circuit to perform the progressive scanning along the second set of scanning lines;
the first duration of the first level of one of the first clock signal and the third clock signal is identical with the duration of the second level of the other of the first clock signal and the third clock signal, the first duration of the first level of one of the second clock signal and the fourth clock signal is identical with the duration of the second level of the other of the second clock signal and the fourth clock signal, the duration of the second level of the first clock signal and the duration of the second level of the second clock signal overlap each other, and the duration of the second level of the third clock signal and the duration of the second level of the fourth clock signal overlap each other; and the control unit is configured to control the duration of the first level to be the second duration at least once for each of the first clock signal, the second clock signal, the third clock signal, and the fourth clock signal during the process of displaying one frame of image by the display panel.

5. The driving circuit according to claim 2, wherein the clock signal generating unit generates at least two clock signals, the second durations of the first levels of the at lest two clock signals overlap each other, and an overlapping time duration of the second durations of the first levels of the at least two clock signals is defined as a suspension duration during which the first levels of the at least two clock signals control the scan driving circuit to suspend a progressive scanning along the scanning lines;

the clock signal generated by the clock signal generating unit is for triggering the scan driving circuit to provide the scanning signal to at least one row of scanning line before the suspension duration, to perform a scanning along the at least one row of scanning line; and the control unit is configured to control, after the suspension duration, the clock signal generating unit to generate the clock signal for triggering the scan driving circuit to re-start the progressive scanning from a next row of scanning line.

6. A display apparatus, comprising:

a display panel, comprising a plurality of display units and a plurality of scanning lines; each scanning line connected to a plurality of display units; the scanning lines configured to transmit scanning signals provided by a scan driving circuit, to the display units; the display units being activated to display an image, based on the scanning signals;

the driving circuit according to claim 5, wherein the driving circuit is configured to drive the display panel to display the image; and a touch panel and a touch detecting circuit connected the touch panel, wherein the touch detecting circuit performs a touch detection on the touch panel during the suspension duration.

7. An electronic apparatus, comprising a first apparatus and a second apparatus, wherein the first apparatus is a display apparatus, the display apparatus comprises the driving circuit according to claim 5, and the second apparatus works during the suspension duration.

8. The electronic apparatus according to claim 7, wherein the second apparatus is a touch apparatus.

9. The electronic apparatus according to claim 8, wherein the touch apparatus comprises a touch panel and a touch detecting circuit connected the touch panel, and the touch detecting circuit performs a touch detection on the touch panel during the suspension duration.

10. The driving circuit according to claim 2, wherein the clock signal generating unit generates at least two clock signals, the second durations of the first levels of the at least two clock signals overlap each other, and an overlapping time duration of the second durations of the first levels of the at least two clock signals is defined as a suspension duration during which the first levels of the at least two clock signals control the scan driving circuit to suspend a progressive scanning along the scanning lines;

the clock signal generated by the clock signal generating unit is for triggering the scan driving circuit to provide the scanning signal to at least one row of scanning line before the suspension duration, to perform a scanning along the at least one row of scanning line; and the control unit is configured to control, after the suspension duration, the clock signal generating unit to generate the clock signal for triggering the scan driving circuit to re-start the progressive scanning from at least a last row of the scanning lines along which the progressive scanning is performed before the suspension duration.

11. The driving circuit according to claim 2, wherein the clock signal generating unit generates at least two clock signals; the first levels of a part of the at least two clock signals are for driving the scan driving circuit to generate the scanning signals, and the second levels of another part of the at least two clock signals are for driving the scan driving circuit to generate the scanning signals; the second durations of the first levels of the at least two clock signals overlap each other; an overlapping time duration of the second durations of the first levels of the at least two clock signals is defined as a suspension duration; and during the suspension duration, the scan driving circuit is controlled, by the a part of the at least two clock signals, to continuously perform a scanning along the scanning lines, and the scan driving circuit is controlled, by the another part of the at least two clock signals, to suspend the scanning along the scanning lines.

12. The driving circuit according to claim 1, wherein the scan driving circuit comprises a first scan driving sub-circuit configured to perform a progressive scanning along a first set of scanning lines, and a second scan driving sub-circuit configured to perform a progressive scanning along a second set of scanning lines, the first set of scanning lines are alternately arranged with the second set of scanning lines;

the clock signal generating unit is configured to generate a first clock signal, a second clock signal, a third clock signal and a fourth clock signal; the first clock signal and the third clock signal are for triggering the first scan driving sub-circuit to perform the progressive scanning along the first set of scanning lines, and the second clock signal and the fourth clock signal are for triggering the second scan driving sub-circuit to perform the progressive scanning along the second set of scanning lines;

the control unit is configured to, control durations of the respective second levels of the first clock signal to be non-identical and control durations of the respective second levels of the third clock signal to be non-identical, the durations of the respective second levels of the first clock signal and the third clock signal comprising a first duration and a second duration, and the second duration being longer than the first duration;

the control unit is further configured, to control durations of the respective first levels of the second clock signal to be non-identical and control durations of the respective first levels of the fourth clock signal to be non-identical, the durations of the respective first levels of the second clock signal and the fourth clock signal comprising a third duration and a fourth duration, and the fourth duration being longer than the third duration;

the control unit is further configured to control the duration of the second level of the first clock signal and the third clock signal to be the second duration at least once and control the duration of the first level of the second clock signal and the fourth clock signal to be the fourth duration at least once, during the process of displaying one frame of image by the display panel;

for the first clock signal and the third clock signal, a sum of a duration of the first level and the first duration of the second level equals the first clock time interval, and a sum of the duration of the first level and the second duration of the second level equals the second clock time interval; and for the second clock signal and the fourth clock signal, a sum of a duration of the second level and the third duration of the first level equals the first clock time interval, and a sum of the duration of the second level and the fourth duration of the first level equals the second clock time interval.

13. The driving circuit according to claim 1, wherein a sum of durations of the first level and the second level of each clock signal generated by the clock signal generating unit is identical with a duration of the scanning signal generated by the scan driving circuit; and the control unit is configured to control durations of the respective first levels of the clock signal to be non-identical, the durations of the respective first levels comprising a first duration and a second duration, and the second duration being longer than the first duration, and the control unit is further configured to control the duration of the first level to be the second duration at least once during the process of displaying one frame of image by the display panel; wherein a sum of the first duration of the first level and the duration of the second level equals the first clock time interval, and a sum of the second duration of the first level and the duration of the second level equals the second clock time interval; or the control unit is configured to control durations of the respective second levels of the clock signal to be non-identical, the durations of the respective second levels comprising a first duration and a second duration, the second duration being longer than the first duration, and the control unit is further configured to control the duration of the second level to be the second duration at least once during the process of displaying one frame of image by the display panel; wherein a sum of the first duration of the second level and the duration of the first level equals the first clock time interval, and a sum of the second duration of the second level and the duration of the first level equals the second clock time interval.

14. The driving circuit according to claim 1, wherein the plurality of scanning lines are further configured to activate a display of respective frames of image based on a vertical synchronization signal provided by a vertical synchronization signal unit, the scan driving circuit is further configured to provide a horizontal synchronization signal; and the control unit is connected to the vertical synchronization signal unit and the scan driving circuit, and is configured to determine, based on the vertical synchronization signal and the horizontal synchronization signal, whether to control the clock time interval of the clock signal to be equal to the second clock time interval.

15. The driving circuit according to claim 14, wherein the control unit comprises:

a memory configured to store preset row information, row information of the scanning lines under a condition that the clock time interval is controlled to be equal to the second clock time interval being set as the preset row information;

a determination module, connected to the vertical synchronization signal unit, the scan driving circuit and the memory, and configured to determine whether a received horizontal synchronization signal meets the preset row information after one vertical synchronization signal is received; and a control module, connected to each of the vertical synchronization signal unit, the scan driving circuit and the determination module, and configured to control the clock time interval of the clock signal output from the clock signal generating unit to be equal to the second clock time interval when the determination module determines that the horizontal synchronization signal meets the preset row information.

16. The driving circuit according to claim 15, wherein the control module is further configured to output the horizontal synchronization signal to the clock signal generating unit, and the clock signal generating unit generates the clock signal based on the horizontal synchronization signal; and the control module is configured to stop outputting the horizontal synchronization signal to the clock signal generating unit for a first preset time duration, when the determination module determines that the horizontal synchronization signal meets the preset row information, to make the clock time interval of the clock signal equal to the second clock time interval.

17. The driving circuit according to claim 15, wherein the control module is configured to generate a stop signal when the determination module determines that the horizontal synchronization signal meets the preset row information, the stop signal comprising an ineffective signal and an effective signal; and the clock signal generating unit is configured to immediately control the clock time interval of an output clock signal to be equal to the second clock time interval, when the stop signal is switched from the ineffective signal to the effective signal; or the clock signal generating unit is configured to control the clock time interval of an output clock signal to be equal to the second clock time interval, after the stop signal is switched from the ineffective signal to the effective signal for a second preset time duration.

18. The driving circuit according to claim 17, wherein the stop signal is a square wave signal comprising a third level and a fourth level, a potential of the third level being different from a potential of the fourth level; and the third level is the effective signal and the fourth level is the ineffective signal; or the fourth level is the effective signal and the third level is the ineffective signal.

19. The driving circuit according to claim 1, wherein the scan driving circuit is integrated in the driving circuit.

20. A display apparatus, comprising:

a display panel, comprising a plurality of display units and a plurality of scanning lines, each scanning line connected to a plurality of display units; the scanning lines configured to transmit scanning signals provided by a scan driving circuit, to the display units; the display units being activated to display an image, based on the scanning signals; and the driving circuit according to claim 1, wherein the driving circuit is configured to drive the display panel to display the image.

21. The display apparatus according to claim 20, wherein the scan driving circuit is integrated in the display panel.

22. The display apparatus according to claim 20, wherein the display panel is a liquid crystal display panel.

23. An electronic apparatus, comprising a display apparatus; wherein the display apparatus comprises:
a display panel comprising a plurality of display units and a plurality of scanning lines; each scanning line connected to a plurality of display units; the scanning lines configured to transmit scanning signals provided by a scan driving circuit, to the display units; the display units being activated to display an image, based on the scanning signals; and
the driving circuit according to claim 1, wherein the driving circuit is configured to drive the display panel to display the image.

24. A driving method, for driving a display panel to display an image; the display panel comprising a plurality of display units and a plurality of scanning lines; each scanning line connected to a plurality of display units; the scanning lines configured to transmit scanning signals provided by a scan driving circuit to the plurality of display units; the display units being activated to display the image, based on the scanning signals; wherein the driving method comprises:
generating clock signals, each of the clock signals comprising a plurality of first levels and a plurality of second levels, wherein the first levels and second levels are alternately output, a potential of each first level is different from a potential of each second level; transitions from the first level to the second level are for triggering the scan driving circuit to generate scanning signals, the transitions from each first level to each second level are defined as effective signal edges of the clock signals, and an interval between adjacent effective signal edges is defined as a clock time interval; and
controlling the clock time intervals of each clock signal to be non-identical, wherein the clock time intervals comprise a first clock time interval and a second clock time interval, the second clock time interval being longer than the first clock time interval; and the clock time interval is controlled to be the second clock time interval at least once during a process of displaying one frame of image by the display panel, wherein the generating the clock signals comprises: generating an initial pulse, and generating the clock signals based on the initial pulse; and
the controlling the clock time interval to be the second clock time interval at least once during a process of displaying one frame of image by the display panel comprises: generating a reset signal at least once during the process of displaying one frame of image by the display panel, wherein the reset signal is for outputting the initial pulse again after a third preset time duration, to make the clock time interval of the clock signal to be equal to the second clock time interval.

25. The driving method according to claim 24, wherein a duration of the second level of each clock signal is identical with a duration of the scanning signal generated by the scan driving circuit;
the controlling the clock time intervals of each clock signal to be non-identical comprises: controlling durations of the respective first levels of each clock signal to be non-identical, the durations of the respective first levels comprise a first duration and a second duration, and the second duration being longer than the first duration; and
the controlling the clock time interval to be the second clock time interval at least once during a process of displaying one frame of image by the display panel comprises: controlling the duration of the first level to be the second duration at least once during the process of displaying one frame of image by the display panel, wherein a sum of the first duration of the first level and a duration of the second level equals the first clock time interval, and a sum of the second duration of the first level and the duration of the second level equals the second clock time interval.

26. The driving method according to claim 25, wherein the generating the clock signals comprises:
generating two clock signals,
wherein the first duration of the first level of one of the two clock signals is identical with the duration of the second level of the other of the two clock signals; and
wherein the duration of the first level is controlled to be the second duration at least once for each of the two clock signals during the process of displaying one frame of image by the display panel.

27. The driving method according to claim 25, wherein the scan driving circuit comprises a first scan driving sub-circuit configured to perform a progressive scanning along a first set of scanning lines, and a second scan driving sub-circuit configured to perform a progressive scanning along a second set of scanning lines; the first set of scanning lines are alternately arranged with the second set of scanning lines;
wherein the generating the clock signals comprises:
generating a first clock signal, a second clock signal, a third clock signal and a fourth clock signal; wherein the first clock signal and the third clock signal are for triggering the first scan driving sub-circuit to perform the progressive scanning along the first set of scanning lines, and the second clock signal and the fourth clock signal are for triggering the second scan driving sub-circuit to perform the progressive scanning along the second set of scanning lines; and
wherein the first duration of the first level of one of the first clock signal and the third clock signal is identical with the duration of the second level of the other of the first clock signal and the third clock signal, the first duration of the first level of one of the second clock signal and the fourth clock signal is identical with the duration of the second level of the other of the second clock signal and the fourth clock signal, the duration of the second level of the first clock signal and the duration of the second level of the second clock signal overlap each other, and the duration of the second level of the third clock signal and the duration of the second level of the fourth clock signal overlap each other; and
wherein the duration of the first level is controlled to be the second duration at least once for each of the first clock signal, the second clock signal, the third clock signal and the fourth clock signal during the process of displaying one frame of image by the display panel.

28. The driving method according to claim 24, wherein the scan driving circuit comprises a first scan driving sub-circuit configured to perform a progressive scanning along a first set of scanning lines, and a second scan driving sub-circuit configured to perform a progressive scanning along a second set of scanning lines, the first set of scanning lines are alternately arranged with the second set of scanning lines;
the generating the clock signals comprises: generating a first clock signal, a second clock signal, a third clock signal and a fourth clock signal, wherein the first clock signal and the third clock signal are for triggering the first scan driving sub-circuit to perform the progressive scanning along the first set of scanning lines, and the second clock signal and the fourth clock signal are for triggering the second scan driving sub-circuit to perform the progressive scanning along the second set of scanning lines;

the controlling the clock time intervals of each clock signal to be non-identical comprises:

controlling durations of the respective second levels of the first clock signal to be non-identical and controlling durations of the respective second levels of the third clock signal to be non-identical, the durations of the respective second levels of the first clock signal and the third clock signal comprising a first duration and a second duration, and the second duration being longer than the first duration; and, controlling durations of the respective first levels of the second clock signal to be non-identical and control durations of the respective first levels of the fourth clock signal to be non-identical, the durations of the respective first levels of the second clock signal and the fourth clock signal comprising a third duration and a fourth duration, and the fourth duration being longer than the third duration;

wherein the duration of the second level of the first clock signal and the third clock signal is controlled to be the second duration at least once and the duration of the first level of the second clock signal and the fourth clock signal is controlled to be the fourth duration at least once, during the process of displaying one frame of image by the display panel;

for the first clock signal and the third clock signal, a sum of a duration of the first level and the first duration of the second level equals the first clock time interval, and a sum of the duration of the first level and the second duration of the second level equals the second clock time interval; and for the second clock signal and the fourth clock signal, a sum of a duration of the second level and the third duration of the first level equals the first clock time interval, and a sum of the duration of the second level and the fourth duration of the first level equals the second clock time interval.

29. The driving method according to claim 24, wherein a sum of durations of the first level and the second level of each clock signal is identical with a duration of the scanning signal generated by the scan driving circuit;

the controlling the clock time intervals of each clock signal to be non-identical comprises: controlling durations of the respective first levels of the clock signal to be non-identical; wherein the durations of the respective first levels comprise a first duration and a second duration, the second duration being longer than the first duration; the duration of the first level is controlled to be the second duration at least once during the process of displaying one frame of image is displayed by the display panel; a sum of the first duration of the first level and the duration of the second level equals the first clock time interval; and a sum of the second duration of the first level and the duration of the second level equals the second clock time interval; or the controlling the clock time intervals of each clock signal to be non-identical comprises: controlling durations of the respective second levels of the clock signal to be non-identical; wherein the durations of the respective second levels comprise a first duration and a second duration, the second duration being longer than the first duration; the duration of the second level is controlled to be the second duration at least once during the process of dislaying one frame of image by the display panel; a sum of the first duration of the second level and the duration of the first level equals the first clock time interval; and a sum of the second duration of the second level and the duration of the first level equals the second clock time interval.

30. The driving method according to claim 24, wherein the plurality of scanning lines are further configured to enable a display of respective frames of image based on a vertical synchronization signal provided by a vertical synchronization signal unit, the scan driving circuit is further configured to provide a horizontal synchronization signal; and the controlling the clock time intervals of each clock signal to be non-identical comprises: determining, based on the vertical synchronization signal and the horizontal synchronization signal, whether to control the clock time interval of the clock signal to be equal to the second clock time interval.

31. The driving method according to claim 30, wherein the determining, based on the vertical synchronization signal and the horizontal synchronization signal, whether to control the clock time interval of the clock signal to be equal to the second clock time interval comprises:

storing preset row information, row information of the scanning lines under a condition that the clock time interval is controlled to be equal to the second clock time interval being set as the preset row information;

determining whether a received horizontal synchronization signal meets the preset row information after one vertical synchronization signal is received; and controlling the clock time interval of the clock signal to be equal to the second clock time interval, when it is determined that the horizontal synchronization signal meets the preset row information.

32. The driving method according to claim 31, wherein the generating the clock signals comprises: generating the clock signals based on the horizontal synchronization signal; and the controlling the clock time interval of the clock signal to be equal to the second clock time interval, when it is determined that the horizontal synchronization signal meets the preset row information comprises: stopping providing the horizontal synchronization signal to the clock signal generating unit, for a first preset time duration in the case that it is determined that the horizontal synchronization signal meets the preset row information, to make the clock time interval of the clock signal equal to the second clock time interval.

33. The driving method according to claim 31, wherein the controlling, in the case that it is determined that the horizontal synchronization signal meets the preset row information, the clock time interval of the clock signal to be equal to the second clock time interval comprises:

generating a stop signal in the case that it is determined that the horizontal synchronization signal meets the preset row information, the stop signal comprising an ineffective signal and an effective signal; and controlling the clock time interval of an output clock signal to be equal to the second clock time interval, immediately when the stop signal is switched from the ineffective signal to the effective signal; or controlling the clock time interval of an output clock signal to be equal to the second clock time interval, after the stop signal is switched from the ineffective signal to the effective signal for a second preset time duration.

34. The driving method according to claim 32, wherein the stop signal is a square wave signal comprising a third level and a fourth level, a potential of the third level being different from a potential of the fourth level; and the third level is the effective signal and the fourth level is the ineffective signal; or the fourth level is the effective signal and the third level is the ineffective signal.

35. The driving method according to claim 24, wherein the generating the clock signals comprises:

generating at least two clock signals, wherein the second durations of the first levels of the at lest two clock signals overlap each other, and an overlapping time duration of the second durations of the first levels of the at least two clock signals is defined as a suspension duration during which the first levels of the at least two clock signals control the scan driving circuit to suspend a progressive scanning along the scanning lines;

generating, before the suspension duration, a clock signal for triggering the scan driving circuit to provide the scanning signal to at least one row of scanning line; and generating, after the suspension duration, a clock signal for triggering the scan driving circuit to re-start the progressive scanning from a next row of scanning line.

36. The driving method according to claim 24, wherein the generating the clock signals comprises:

generating at least two clock signals, wherein the second durations of the first levels of the at least two clock signals overlap each other, and an overlapping time duration of the second durations of the first levels of the at least two clock signals is defined as a suspension duration during which the first levels of the at least two clock signals control the scan driving circuit to suspend a progressive scanning along the scanning lines;

generating, before the suspension duration, a clock signal for triggering the scan driving circuit to provide the scanning signal to at least one row of scanning line; and generating, after the suspension duration, a clock signal for triggering the scan driving circuit to re-start the progressive scanning from at least a last row of the scanning lines along which the progressive scanning is performed before the suspension duration.

37. The driving method according to claim 24, wherein the generating the clock signals comprises:

generating at least two clock signals; wherein the first levels of a part of the at least two clock signals are for driving the scan driving circuit to generate the scanning signals, and the second levels of another part of the at least two clock signals are for driving the scan driving circuit to generate the scanning signals; the second durations of the first levels of the at least two clock signals overlap each other; an overlapping time duration of the second durations of the first levels of the at least two clock signals is defined as a suspension duration; and during the suspension duration, the scan driving circuit is controlled, by the a part of the at least two clock signals, to continuously perform a scanning along the scanning lines, and the scan driving circuit is controlled, by the another part of the at least two clock signals, to suspend the scanning along the scanning lines.

* * * * *